US008185519B2

(12) United States Patent
Chaudhuri et al.

(10) Patent No.: US 8,185,519 B2
(45) Date of Patent: May 22, 2012

(54) TECHNIQUES FOR EXACT CARDINALITY QUERY OPTIMIZATION

(75) Inventors: Surajit Chaudhuri, Redmond, WA (US); Vivek Narasayya, Redmond, WA (US); Ravishankar Ramamurthy, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 194 days.

(21) Appl. No.: 12/404,284

(22) Filed: Mar. 14, 2009

(65) Prior Publication Data

US 2010/0235347 A1 Sep. 16, 2010

(51) Int. Cl.
G06F 7/00 (2006.01)
G06F 17/30 (2006.01)

(52) U.S. Cl. ... 707/714; 707/718; 707/769; 707/E17.75; 707/E17.132

(58) Field of Classification Search ............... 707/714, 707/718, 719, 769, E17.017, E17.078, E17.014, 707/E17.75, E17.132; 715/968
See application file for complete search history.

(56) References Cited

U.S. PATENT DOCUMENTS

| 5,671,403 | A * | 9/1997 | Shekita et al. .......... 707/999.002 |
|---|---|---|---|
| 5,761,653 | A * | 6/1998 | Schiefer et al. ............... 707/713 |
| 6,014,656 | A * | 1/2000 | Hallmark et al. ....... 707/999.002 |
| 6,338,056 | B1 * | 1/2002 | Dessloch et al. ....... 707/999.002 |
| 6,732,110 | B2 | 5/2004 | Rjaibi et al. |
| 6,738,755 | B1 | 5/2004 | Freytag et al. |
| 6,763,359 | B2 * | 7/2004 | Lohman et al. ............... 707/718 |
| 6,847,978 | B2 | 1/2005 | Ellis et al. |
| 6,947,927 | B2 | 9/2005 | Chaudhuri et al. |
| 7,146,363 | B2 | 12/2006 | Waas et al. |
| 7,240,044 | B2 | 3/2007 | Chaudhuri et al. |
| 7,249,120 | B2 | 7/2007 | Bruno et al. |
| 7,363,289 | B2 * | 4/2008 | Chaudhuri et al. ..... 707/999.102 |
| 7,865,503 | B2 * | 1/2011 | Piedmonte ..................... 707/714 |
| 2004/0205052 | A1 * | 10/2004 | Gloor et al. ....................... 707/3 |
| 2005/0278357 | A1 | 12/2005 | Brown et al. |
| 2007/0078808 | A1 | 4/2007 | Haas et al. |
| 2007/0266000 | A1 * | 11/2007 | Piedmonte ........................ 707/2 |
| 2009/0094191 | A1 * | 4/2009 | Chaudhuri et al. ............... 707/2 |
| 2009/0254522 | A1 * | 10/2009 | Chaudhuri et al. ............... 707/3 |

OTHER PUBLICATIONS

Chaudhuri et al.—"As Pay-As-You-Go Framework for Query Execution Feedback"—PVLDB'08 Aug. 23-28, 2008, Auckland, New Zealand, 2008 VLDB Endowment, ACM (pp. 1141-1152).*
Bruno et al.—"Exploiting Statistics on Query Expressions for Optimization"—Proceedings of the 2002 ACM SIGMOD International Conference on Management of Data, Jun. 4-6, 2002 (pp. 263-274).*

(Continued)

*Primary Examiner* — John E Breene
*Assistant Examiner* — Anh Ly
(74) *Attorney, Agent, or Firm* — Lyon & Harr, L.L.P.; Craig S. Fischer

(57) ABSTRACT

An exact cardinality query optimization system and method for optimizing a query having a plurality of expressions to obtain a cardinality-optimal query execution plan for the query. Embodiments of the system and method use various techniques to shorten the time necessary to obtain the cardinality-optimal query execution plan, which contains the query execution plan when all cardinalities are exact. Embodiments of the system and method include a covering queries technique that leverages query execution feedback to obtain an unordered subset of relevant expressions for the query, an early termination technique that bounds the cardinality to determine whether the processing can be terminate before each of the expressions are executed, and an expressions ordering technique that finds an ordering of expressions that yields the greatest reduction in time to obtain the cardinality-optimal query execution plan.

18 Claims, 11 Drawing Sheets

OTHER PUBLICATIONS

Shah et al.—"Rank-aware Query Optimization"—Proceedings of the 2004 ACM SIGMOD International Conference on Management of Data, Jun. 13-18, 2004 (pp. 1-12).*

Aboulnaga, A., and S. Chaudhuri, Accurate query optimization by sub-plan memoization, Microsoft Research TechReport, MSR-TR-1999-102, Dec. 1999, pp. 1-16.

Aboulnaga, A., P. J. Haas, S. Lightstone, G. M. Lohman, V. Markl, I. Popivanov, V. Raman, Automated statistics collection in DB2 UDB, Very Large Data Bases, 2004, pp. 1146-1157.

Babcock, B., S. Chaudhuri, Towards a robust query optimizer: A principled and practical approach, Proc. of the ACM SIGMOD Int'l Conf. on Management of Data, Jun. 14-16, 2005, pp. 119-130.

Bruno, N., S. Chadhuri, Exploiting statistics on query expressions for optimization, Proc. of the 2002 ACM SIGMOD Int'l Conf. on Management of Data, Jun. 3-6, 2002, pp. 263-274, Madison, Wisconsin.

Cardinality Estimation Model in SQL Server Query Optimizer, Apr. 27, 2006, retrieved from https://web3.iut.u-bordeaux1.fr/info/Conferences/SQL/Cardinality_Estimation_Model.pdf.

Chaudhuri, S., V. R. Narasayya, R. Ramamurthy, A pay-as-you-go framework for query execution feedback, 34th Int'l Conf. on Very Large Data Bases, Aug. 2008, vol. 1, No. 1, pp. 1141-1152.

Chaudhuri, S., V. R. Narasayya, Automating statistics management for query optimizers, IEEE Trans. Knowl. Data Eng., Jan./Feb. 2001, pp. 7-20, vol. 13, No. 1.

Chen, C.-M., N. Roussopoulos, Adaptive selectivity estimation using query feedback, Proc. of the 1994 ACM SIGMOD Int'l Conf. on Management of Data, May 1994, pp. 161-172.

Dageville, B., D. Das, K. Dias, K. Yagoub, M. Zaït, M. Ziauddin, Automatic SQL tuning in Oracle 10g, Proc. of the Thirtieth Int'l Conf. on Very Large Data Bases, Toronto, Canada, Aug. 31-Sep. 3, 2004, pp. 1098-1109.

Ives, Z. G., A. Deshpande, V. Raman, Adaptive query processing: Why, How, When, and What Next?, Proc. of the 33rd Int'l Conf. on Very Large Data Bases, Sep. 2007, pp. 1426-1427.

El-Helw, A., I. F. Ilyas, W. Lau, V. Markl, C. Zuzarte, Collecting and maintaining just-in-time statistics, Proc. of the 23rd Int'l Conf. on Data Engineering, Apr. 2007, pp. 516-525.

Graefe, G., The cascades framework for query optimization, IEEE Data Eng. Bull., vol. 18, No. 3, pp. 19-29, Sep. 1995.

Ioannidis, Y. E., S. Christodoulakis, On the propagation of errors in the size of join results, Proc. of the 1991 ACM SIGMOD Int'l Conf. on Management of Data, May 1991, pp. 268-277.

Ioannidis, Y. E., The history of histograms, Proc. of 29th Int'l Conf. on Very Large Data Bases, Sep. 9-12, 2003, pp. 19-30.

Kabra, N., D. J. DeWitt, Efficient mid-query re-optimization of sub-optimal query execution plans, Proc. ACM SIGMOD Int'l Conf. on Management of Data, Jun. 2-4, 1998, pp. 106-117.

Lipton, R. J., J. F. Naughton, D. A. Schneider, Practical selectivity estimation through adaptive sampling, Proc. of the 1990 ACM SIGMOD Int'l Conf. on Management of Data, May 1990, pp. 1-11.

Markl, V., V. Raman, D. E. Simmen, G. M. Lohman, H. Pirahesh, Robust query processing through progressive optimization, Proc. of the ACM SIGMOD Int'l Conf. on Management of Data, Jun. 2004, pp. 659-670.

Patel, B. A., Forcing query plans, Nov. 1, 2005, retrieved from http://www.microsoft.com/technet/prodtechnol/sql/2005/frcqupln.mspx, pp. 1-14.

Quest Software Inc., Quest Software, retrieved Nov. 12, 2008 from http://www.quest.com/.

Shironoshita, E. P., M. T. Ryan, M. R. Kabuka, Cardinality estimation for the optimization of queries on ontologies, SIGMOD Record, Jun. 2007, vol. 36, No. 2, pp. 13-18.

Stillger, M., G. M. Lohman, V. Markl, M. Kandil, Leo—DB2's learning optimizer, Proc. of 27th Int'l Conf. on Very Large Data Bases, Sep. 2001, pp. 19-28.

TPC, Transaction Processing Performance Council, retrieved Nov. 12, 2008 from http://www.tpc.org/, pp. 1-2.

* cited by examiner

TECHNIQUES FOR EXACT CARDINALITY QUERY OPTIMIZATION

BACKGROUND

Database management systems (DBMS) utilize query optimizers to select an appropriate query execution plan for a given query. The query optimizer uses a cost model, and a key parameter of the cost model is the cardinality of sub-expressions of the query considered during optimization. Given an expression, the cardinality is the number of rows output of the expression when the expression is evaluated on the database. Obtaining accurate cardinality estimates can be crucial for finding a good query execution plan.

Current query optimizers trade accuracy of cardinality estimation (and hence quality of execution plan) for speed of optimization. The time used for query optimization is kept to a minimum by utilizing various approximation techniques (such as histograms) to quickly obtain cardinality estimates. While these approximation techniques ensure that the query optimization time is kept low, this speed comes at a cost of estimation errors. For example, it is well known that cardinality estimation errors can grow exponentially in the number of joins in a query. This can cause the query optimizer to pick an execution plan that is significantly less accurate than the query plan that uses accurate (or exact) cardinalities for the sub-expressions.

While the above trade-off between optimization time and cardinality accuracy (or execution plan quality) is necessary for specific or ad hoc queries, it is a fundamental challenge to understand to what extent the query execution plan quality is affected by errors in cardinality estimation. In order to understand this relationship, it is highly desirable to be able to obtain the "best" query execution plan without regard for query optimization time. The best execution plan is defined as the plan obtained by using exact cardinalities. Using exact cardinalities for sub-expressions of the query yields the maximum accuracy and thus gives the cardinality-optimal query execution plan, which is the optimal query execution plan based on cardinality.

Often it is desirable to estimate the cardinalities to obtain an execution plan as quickly as possible, but there are important scenarios where using exact cardinalities to obtain the best query execution plan can be extremely valuable. In these cases accuracy is preferred over speed. One scenario is query optimizer testing, where, for a given query, it can be important to know the execution plan given the assumption that the optimizer did not make any cardinality estimation errors. Such a plan serves as a benchmark against which other execution plans can be compared and can also help narrow down the cause of an execution plan quality problem. Thus, having access to the plan obtained using exact cardinalities can be very useful for query optimizer testing. Another scenario is repeated queries, where a particular important query can be repeatedly executed by the application. In such cases it is useful for a database application to obtain a plan that is as good as possible. The ability to produce an execution plan having no cardinality estimation errors is quite valuable in this context.

In the above scenarios accuracy is preferred over speed. However, it is still desirable to obtain the exact cardinalities as quickly as possible, so any technique that decreases the time necessary to obtain exact cardinalities is highly desirable. Despite its usefulness the problem of optimizing the time required to find the execution plan having exact cardinalities remains by and large unexplored. Of course, the natural approach of executing one query per relevant expression to obtain its cardinality can be prohibitively expensive since for many reasons. A main reason is that often there are a large number of relevant expressions for a query, and the time is takes to execute each of these queries can be significant.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Embodiments of the exact cardinality query optimization system and method optimize an input query having multiple expressions to obtain a cardinality-optimal execution plan for the query. The cardinality-optimal execution plan is the query execution plan obtained when each of the expressions in the plan has exact cardinalities. Recall that for existing query optimization, the goal is to optimize the query in a short period of time and obtain as good a plan as possible within that time. One way that existing query optimization techniques shorten the time required to find a query execution plan is by reducing the accuracy of the cardinality estimates.

In contrast, embodiments of the exact cardinality query optimization system and method are constrained to output the "best" query execution plan. In this case, the "best" query execution plan is the plan when all cardinalities are exact, or the cardinality-optimal execution plan. Since the time necessary to compute the best query execution plan can potentially be significant, any improvements that reduce this time are valuable.

Time reduction techniques for exact cardinality query optimization are especially important for a repeated queries scenario where a database application may stop the query optimizer after a certain point and settle for the query execution plan obtained to that point. In such cases, it would be ideal if the query optimizer could converge to the best plan as quickly as possible.

Embodiments of the exact cardinality query optimization system include several modules that are used to improve the speed at which the cardinality-optimal query execution plan is obtained. In order to achieve improvements in speed, the system includes a covering queries optimization module, an early termination module, and an expressions ordering module. The system inputs a query and uses the techniques embodied in the modules to obtain the cardinality-optimal query execution plan.

Embodiments of the exact cardinality query optimization system also include a variety of techniques to reduce the time needed to obtain the cardinality-optimal query execution plan. One technique is the covering queries technique used by the covering queries optimization module. The covering queries optimization technique leverages the idea of query execution feedback, which already exists in current database management systems. In particular, the covering queries optimization technique selects a subset of expressions in the set of relevant expressions of a query such that by executing the subset of expressions on a database the cardinalities of each of the relevant expressions become available. The covering queries optimization technique uses a benefit value, which is defined as the feedback of an executed expression minus a set of expressions for which exact cardinalities have been obtained. Then entire result is divided by an optimizer estimated cost of executing the expression. The expressions having the highest benefit value are selected for inclusion in the unordered subset of relevant expressions, which is output from the covering queries optimization module.

Another technique is an early termination technique used by the early termination module. The input for this technique is the unordered subset of relevant expressions. A lower bound and an upper bound are initialized for the cardinalities of expressions where exact cardinalities have not been computed. For each of the expressions in the unordered subset, a benefit is computed, where the computed benefit is based on a feedback of the expression after execution.

When the early termination technique (or test) is executed, a low query execution plan and a high query execution plan are computed. In addition, the current query execution plan is checked. The low query execution plan is based on a cardinality at a lower bound and the high query execution plan is based on a cardinality at an upper bound. When the low execution plan equals the high execution plan, early termination is possible. This means that the current query execution plan will get no better, and is defined as the cardinality-optimal query execution plan. If the low query execution plan does not equal the high query execution plan, then the selected expression is executed and exact cardinalities are obtained for the expression. Until the low query execution plan equals the high query execution plan, expressions continue to be selected in a descending order of benefit. In addition, the exact cardinalities for the selected expression are used to refine the lower and upper bounds for the next selected expression.

Another technique is an expressions ordering technique used by the expressions ordering module. In some cases the ordering of execution of expressions in the query execution plan makes a difference. The expressions ordering technique seeks to find the ordering of expressions that yields the greatest reduction in time to obtain the cardinality-optimal cardinality query execution plan. It should be noted that the expressions ordering technique works for the special but important case of an instance of a stored procedure or parameterized query. Since the set of relevant expressions for any two instances of the same stored procedure is the same (modulo the constants), it is possible to leverage information from one or more instances for which exact cardinality query optimization has been previously performed to improve the convergence for a new instance of the same stored procedure.

The expressions ordering technique uses previously stored queries and partitions the queries into groups using clustering techniques. For a new query, the query is first mapped to an existing group. Each expression then is analysed and placed into an essential set or a non-essential set. The ordering of the expressions then is modified to give priority to those expressions contained in the essential sets. This modified set of expressions can be input to the covering queries module as described above to obtain the cardinality-optimal query execution plan as quickly as possible.

It should be noted that alternative embodiments are possible, and that steps and elements discussed herein may be changed, added, or eliminated, depending on the particular embodiment. These alternative embodiments include alternative steps and alternative elements that may be used, and structural changes that may be made, without departing from the scope of the invention.

DRAWINGS DESCRIPTION

Referring now to the drawings in which like reference numbers represent corresponding parts throughout:

DETAILED DESCRIPTION

In the following description of embodiments of the exact cardinality query optimization system and method reference is made to the accompanying drawings, which form a part thereof, and in which is shown by way of illustration a specific example whereby embodiments of the exact cardinality query optimization may be practiced. It is to be understood that other embodiments may be utilized and structural changes may be made without departing from the scope of the claimed subject matter.

I. System Overview

Figure 1:
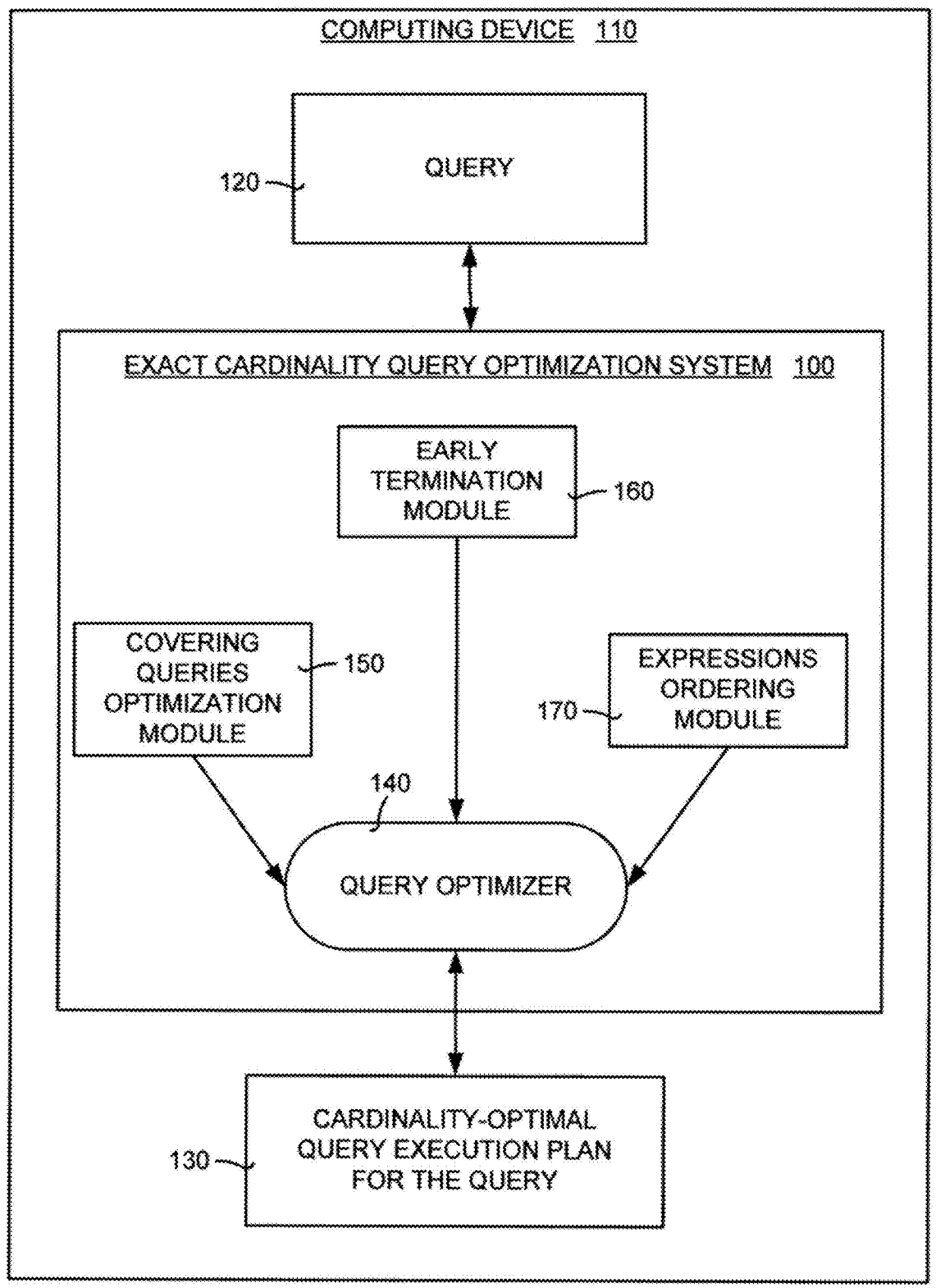
FIG. 1 is a block diagram illustrating a general overview of embodiments of the exact cardinality query optimization system and method disclosed herein.

FIG. 1 is a block diagram illustrating a general overview of embodiments of the exact cardinality query optimization system and method disclosed herein. It should be noted that the implementation shown in FIG. 1 is only one of many implementations that are possible. Referring to FIG. 1, an exact cardinality query optimization system 100 is shown implemented on a computing device 110. It should be noted that the computing device 110 may include a single processor (such as a desktop or laptop computer) or several processors and computers connected to each other.

In general, the exact cardinality query optimization system 100 obtains a query 120. This query 120 is processed by the exact cardinality query optimization system 100, and the output of the system 100 is a cardinality-optimal query execution plan for the query 130. The cardinality-optimal query execution plan is the query execution plan whereby each expression in the query has exact cardinalities. Instead of executing each expression in the query, embodiments of the exact cardinality query optimization system 100 seek to obtain the exact cardinalities in as short a time as possible by executing the smallest amount of queries necessary to obtain exact cardinalities for each expression. As explained in detail below, embodiments of the exact cardinality query optimization system 100 use at least one of three techniques to accomplish this task.

Embodiments of the exact cardinality query optimization system 100 also includes a query optimizer 140. The query optimizer is used to find an execution plan for any submitted query. In order to obtain the cardinality-optimal query execution plan 130, the query optimizer 140 makes use of one or more of a covering queries optimization module 150, an early termination module 160, and an expressions ordering module 170. In some embodiments, the query optimizer 140 is based on the Cascades framework. However, in other embodiments the techniques used in the exact cardinality query optimization system 100 are applicable to other optimizer architectures as well.

In general, the covering queries optimization module 150 finds a subset of the set relevant expressions in the query 120 to obtain an unordered subset of relevant expressions. These relevant expressions are ordered or ranked based on benefit to finding the exact cardinalities. By way of example, assume that the query 120 includes three expressions (E1, E2, and E3). Suppose a first strategy is to execute E1 and look at the results, execute E2 and look at the results, and then execute E3 and look at the results. Suppose further that a second strategy is to notice that when E1 is executed E2 is obtained as a byproduct. It may also happen that if E3 is executed that E2 also is obtained. Thus, it is observed that if E1 is executed first then E2 also is obtained, and then only E3 needs to be executed. Thus, by only executing E1 and E3 the set of all expressions is found along with each of the cardinalities. Or, only E3 and E2 could be executed and still all the cardinalities would be obtained. In this example, the covering queries optimization module 150 would select the execution plan having the lowest cost from among these two choices.

In general, the early termination module 160 determines whether the cardinality-optimal query execution plan 130 has already been obtained before the processing is completed. In other words, it can occur that the cardinality-optimal query execution plan 130 has already been found even though only a portion of the cardinalities has been obtained. In this case, there is no need to obtain the remaining cardinalities because the cardinality-optimal query execution plan 130 plan will not change. If it is detected that the cardinality-optimal query execution plan 130 has already been obtained then processing can stop. This is called "early termination."

The expressions ordering module 170 find the ordering of executing expressions that yields the quickest convergence to the cardinality-optimal query execution plan 130. The module 170 achieves this by determining which cardinalities are important. The general idea is go back to other instances of the same query, analyze the important expressions from that query, and try to group those queries in such a way so that the query 120 can be matched to one of those groups. The ordering of the expressions in query then is based on the expressions from the matched group. As noted above, the expressions ordering module 170 is used when the set of relevant expressions for any two instances of the same stored procedure is the same.

II. Operational Overview

Figure 2:
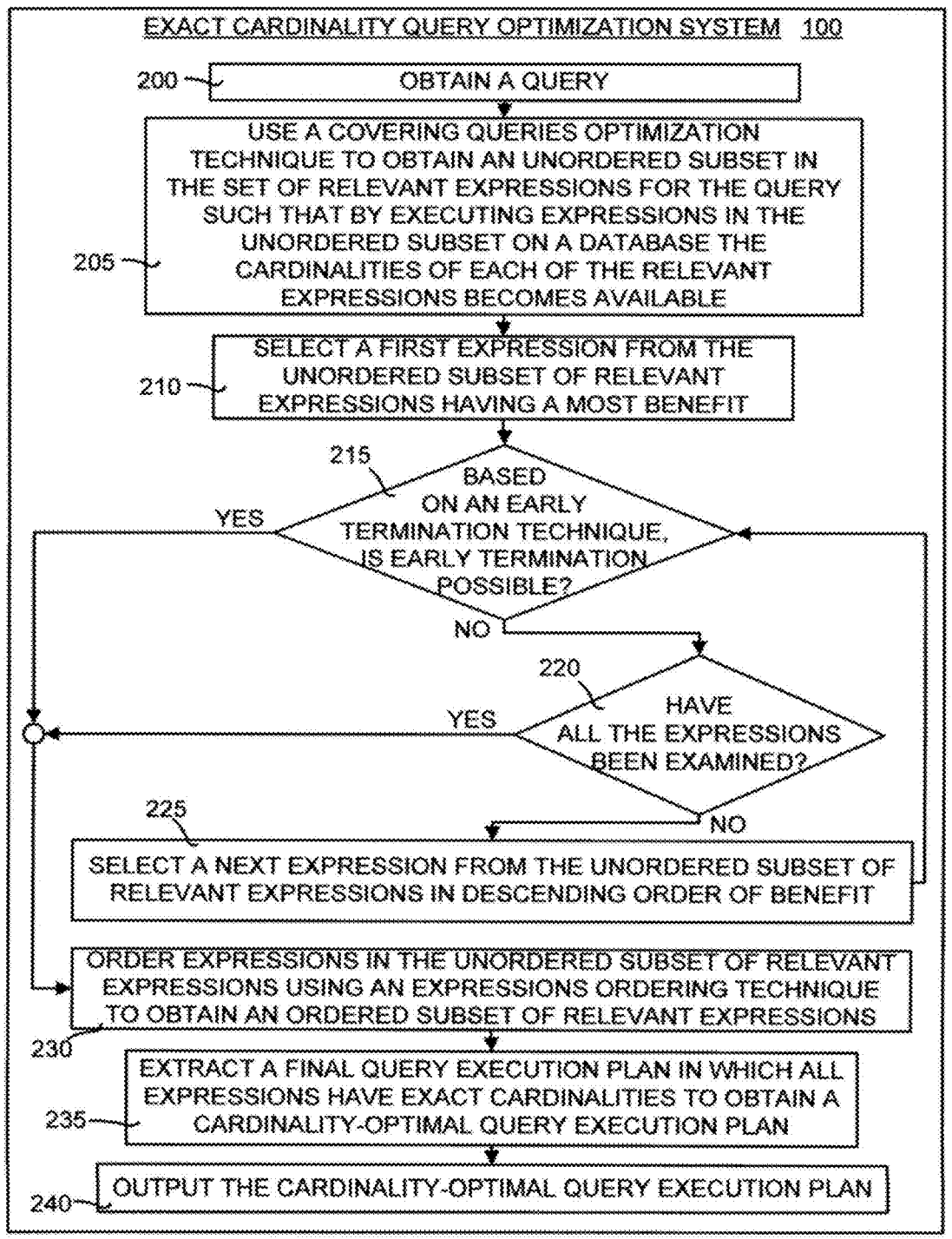
FIG. 2 is a flow diagram illustrating the operation of embodiments of the exact cardinality query optimization system and method shown in FIG. 1.

FIG. 2 is a flow diagram illustrating the operation of embodiments of the exact cardinality query optimization system 100 and method shown in FIG. 1. In general, the system 100 uses the methods of the covering queries optimization module 150, the early termination module 160, and the expressions ordering module 170. Referring to FIG. 2, the method begins by obtaining a query (box 200). The system 100 then uses a covering queries optimization technique to obtain an unordered subset of relevant expressions for the query such that by executing the expressions on a database the cardinalities of each of the relevant expressions becomes available (box 205). The covering queries optimization technique is discussed in detail below.

The system 100 then selects a first expression from the unordered subset of relevant expressions (box 210). The first expression selected from this unordered subset is the expression having a most benefit (or a highest benefit value, as discussed in detail below). A determination then is made as to whether early termination is possible at this point in the processing (box 215). This determination is based on an early termination technique, which is discussed in detail below. If early termination is not possible, then the system 100 determines whether each of the expressions has been examined (box 220). If not, then the next expression in order of benefit (or having the next highest benefit value) is selected from the unordered subset of relevant expressions (box 225). Each time another expression is selected from the unordered subset for processing the selection is made descending order of benefit. The selected expression then is processed as above beginning with the determination of whether early termination is possible at this point in the processing based on the early termination technique.

If early termination is possible, or if all of the expressions have been examined then the expressions in the unordered subset of relevant expressions are ordered using an expressions ordering technique (box 230). This yields an ordered subset of relevant expressions. Next, a final query execution plan is extracted (box 235). The extracted plan is the cardinality-optimal query execution plan 130. Each of the expressions in the plan 130 has exact cardinalities. The output of the exact cardinality query optimization system is the cardinality-optimal query execution plan (box 240).

III. Operational Details

The operational details of embodiments of the exact cardinality query optimization system 100 and method now will be discussed. These embodiments include embodiments of the covering queries optimization module 150, the early termination module 160, and the expressions ordering module 170 shown in FIG. 1. The operational details of each of these programs modules now will be discussed in detail.

III.A. Preliminaries

Before examining the details of each of the program modules noted above, some preliminary concepts and notation will be discussed to make the subsequent discussion clearer.

III.A.1. Query Optimizer

One input to the cost model of the query optimizer 140 is the cardinality of relevant logical sub-expressions of the query. Note that for simplicity the terms sub-expression and expression are used interchangeably. The query optimizer 140 considers a set of sub-expressions of the given query during optimization. By way of example, the Microsoft® SQL Server optimizer maintains a memo data structure. Each node in the memo is a group, which represents a logical expression. Expressions in the memo are related to one another by parent-child relationships, which indicate that the child expression is an input to the parent expression. Embodiments of the exact cardinality query optimization system 100 assume that the set of relevant expressions for a query is the set of groups in the memo that correspond to relational expressions.

By way of example, consider the following query on the Transaction Processing Performance Council "H" (TPC-H)

database. Note that example will be referred to throughout this document as "Example 1."

Example 1

```
SELECT ... FROM Lineitem, Orders, Customer
WHERE l_orderkey = o_orderkey
AND o_custkey = c_custkey
AND l_shipdate > '2008-01-01'
AND l_receiptdate < '2008-02-01'
AND l_discount < 0.05
AND o_orderpriority = 'HIGH'
AND c_mktsegment = 'AUTOMOBILE'
```

In Example 1, suppose that there are single column indexes on (l_shipdate) and (l_receiptdate) in the database. The expressions whose cardinalities are considered by a typical query optimizer consist of the following 6 single-table expressions and 3 join expressions: (l_shipdate>'2008-01-01'), (l_receiptdate<'2008-02-01'), (l_shipdate>'2008-01-01' AND l_receiptdate<'2008-02-01'), (l_shipdate>'2008-01-01' AND l_receiptdate<'2008-02-01' AND l_discount<0.05), (o_orderpriorty='HIGH'), (c_mktsegment='AUTOMOBILE'), (Customer ⋈ Orders), (Orders ⋈ Lineitem), (Lineitem ⋈ Orders ⋈ Customer). Thus, the naïve approach requires executing each of the above nine expressions to obtain the respective cardinalities. This process can be very expensive.

Figure 3:
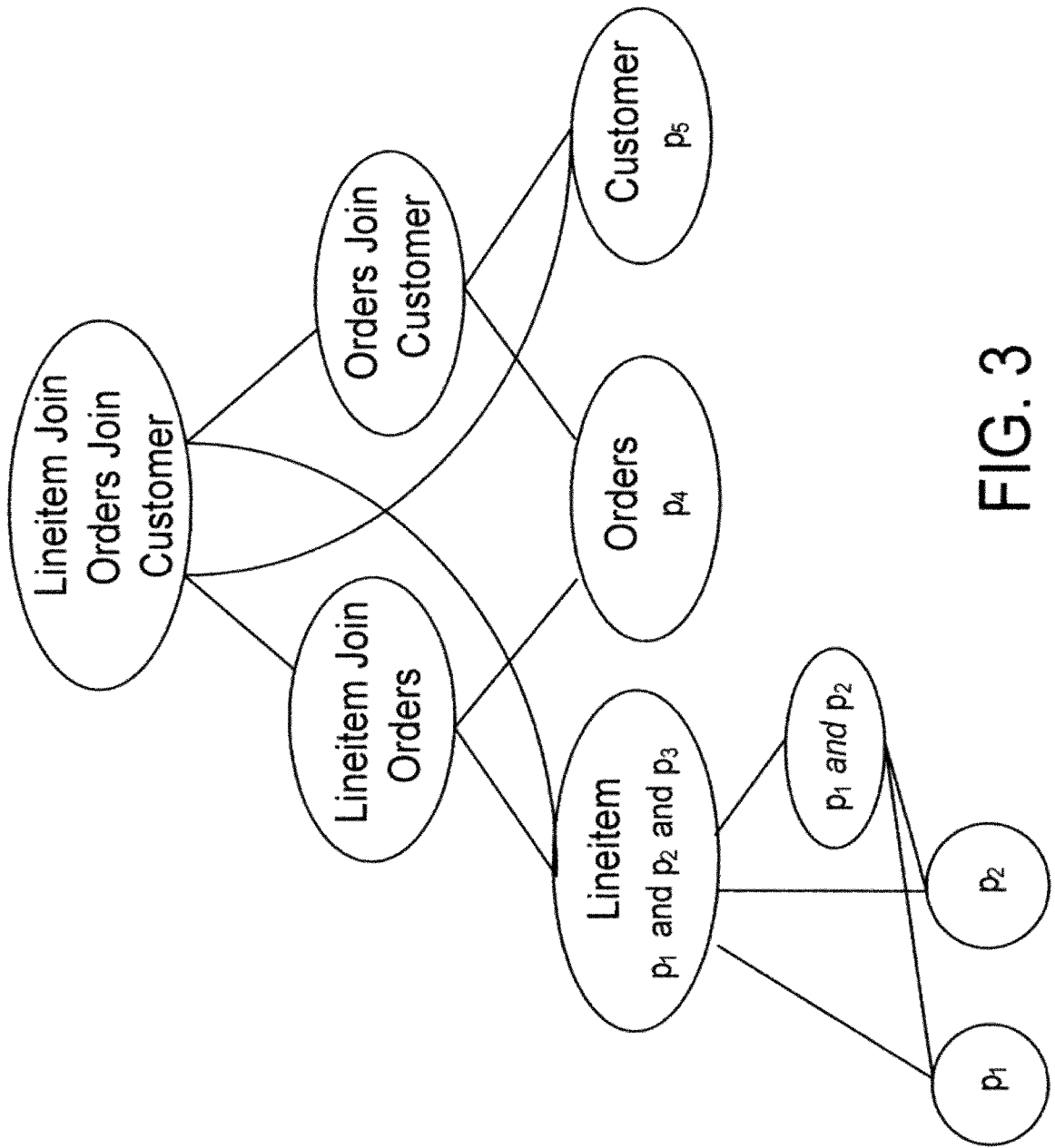
FIG. 3 illustrates an example of expressions whose cardinalities are used by the query optimizer for a query on a TPC-H database.

FIG. 3 illustrates an example of expressions whose cardinalities are used by the query optimizer 140 for a query on a TPC-H database. This query is given above in Example 1. In FIG. 3, $p_1$=(l_shipdate>'2008-01-01'), $p_2$=(l_receiptdate<'2008-02-01'), $p_3$=l_discount<0.05, $p_4$=(o_orderpriority='HIGH') and $p_5$=(c_mktsegment='AUTOMOBILE'). Each node is a logical sub-expression of the original query. The cardinality a parent expression depends on the cardinality of its children (or the inputs). It should also be noted that the expressions are a function of the physical design. In other words, the expressions (l_shipdate>'2008-01-01') and (l_receiptdate<'2008-02-01') are present due to the possibility of Index Seek execution plans and the expression (l_shipdate>'2008-01-01' AND l_receiptdate<'2008-02-01') is present due to the possibility of an Index Intersection execution plan.

III.A.2. Cardinality Estimation

Existing query optimizers rely on summary statistics such as a histogram of the column values and the number of distinct values of in a column. Since DBMSs do not maintain multi-column statistics, when an expression has multiple predicates, query optimizers resort to simplifying assumptions such as independence between predicates and containment (for joins) to estimate expression cardinality. As a consequence, the errors in cardinality estimation can become significant leading to poor choice of execution plan.

III.A.3. Cardinality-Optimal Plan

For a given query optimizer, one reason for choice of sub-optimal execution plan is inaccurate cardinality estimates. In this document, the execution plan obtained when exact cardinality estimates are used for each relevant expression is referred to as the cardinality-optimal query execution plan 130 for the particular query.

III.A.4. Notation

For a given query Q, the set of all relevant expressions for the query is denoted by $R_Q$. At any point during exact cardinality query optimization, let $S \subseteq R_Q$ be the set of expressions for which exact cardinalities have been obtained. The execution plan obtained in the above situation is referred to as Plan(Q,S). Note that for expressions in $R_Q$−S optimizer estimated cardinalities are used, which may not be exact. Cost (Q,S) is used to denote the optimizer estimated cost of Plan (Q,S). Using the above notation, Plan(Q, $R_Q$) (resp. Cost(Q, $R_Q$)) is the cardinality-optimal query execution plan 130 (resp. cost). Similarly, Plan(Q,{ }) is the plan obtained by the default optimizer. The default optimizer is When all expressions use optimizer estimated cardinalities. Note that the notation Plan(Q) and Cost(Q) is also used for this special case.

Embodiments of the exact cardinality query optimization system 100 seek to find the cardinality-optimal query execution plan 130 (or Plan (Q, $R_Q$)) as quickly as possible. Thus the objective is the efficiency of the query optimization step itself. Note that the output of the exact cardinality query optimization system 100 is required to be the cardinality-optimal query execution plan 130.

Once a sufficient set of cardinalities are obtained and the memo has been updated, extracting the plan from the memo produces the cardinality-optimal query execution plan 130. Note that two key mechanisms are required in the above architecture. First, a mechanism is needed for obtaining execution feedback (or obtaining expression cardinalities from a query execution plan). Existing DBMSs already expose such functionality. Second, the query optimizer 140 is equipped with a mechanism for overriding the estimated cardinality for a given expression with the accurate cardinality. This cardinality is enforced for the group corresponding to the logical expression in the memo. As a result, all expressions that are equivalent to this expression and are part of the same group in the memo will also use the same cardinality value.

III.B. Covering Queries Optimization

As noted above, embodiments of the exact cardinality query optimization system 100 seek to find the cardinality-optimal query execution plan 130 (or plan (Q, $R_Q$)) as quickly as possible. The naive approach for obtaining the cardinality-optimal query execution plan 130 is to execute each expression in $R_Q$ and thus obtain the cardinalities of all relevant expressions. However, this is not the most efficient approach.

It should be noted that as a by-product of executing an expression e in $R_Q$, the cardinalities of other expressions in $R_Q$ can be obtained as well. Thus, it is potentially unnecessary to execute all expressions in $R_Q$ in order to obtain cardinalities of all expressions in $R_Q$. First, when an expression e∈$R_Q$ is executed by counting the actual number of rows for all operators in its execution plan, the exact cardinalities of other relevant expressions for Q may also become available at the end of execution. Mechanisms for obtaining expression cardinality via query execution feedback already exist. Thus, one way of improving efficiency of exact cardinality query optimization is to select a subset of expressions in $R_Q$ to execute such that by executing that subset, the cardinalities of all relevant expressions become available. This technique, used by the covering queries optimization module 100 is referred to as the covering queries optimization technique.

Figure 4:
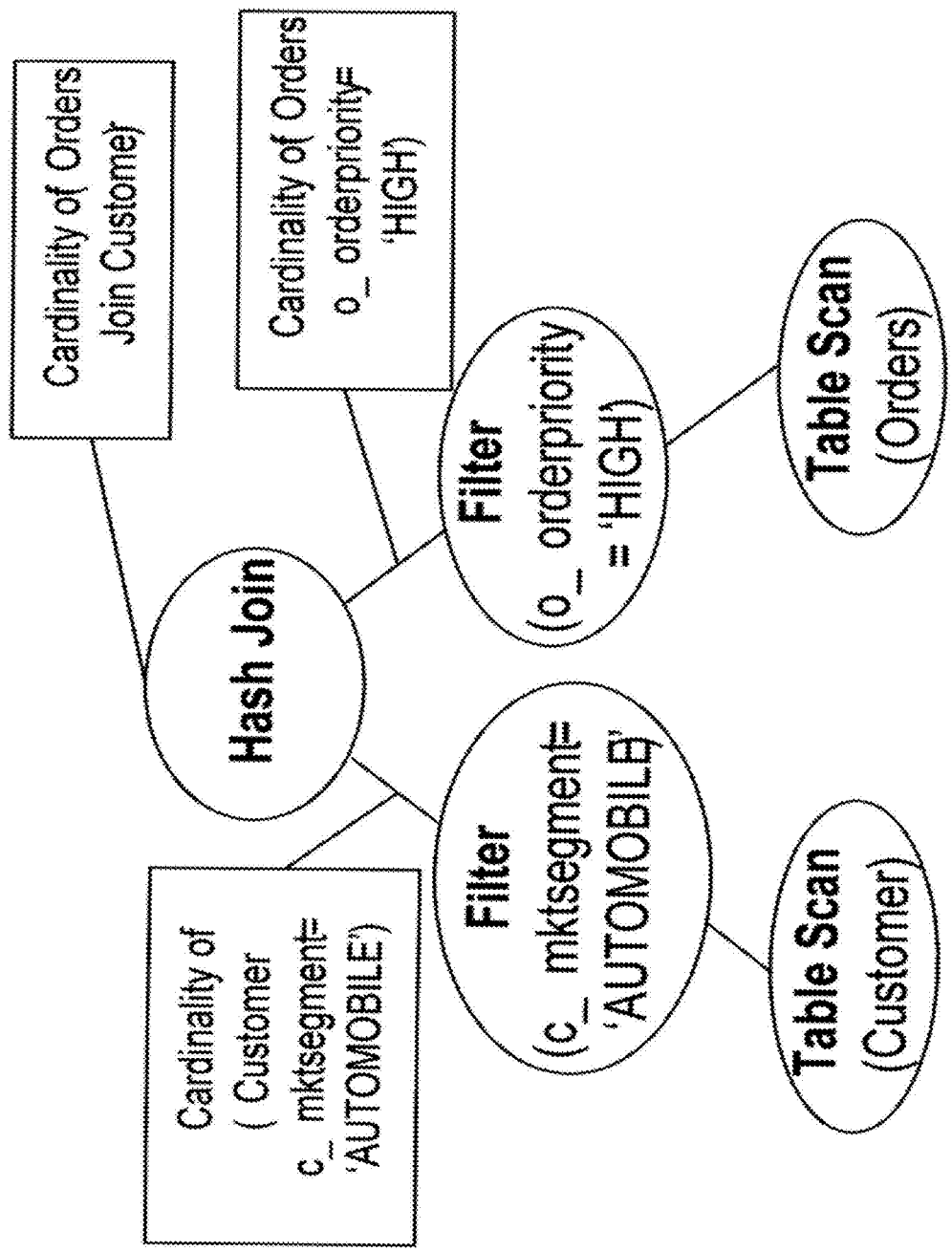
FIG. 4 illustrates obtaining cardinalities of multiple expressions by executing a single expression.

Consider the query expression given above in Example 1. Assume that the expression $e_1$=(Customer ⋈ Orders) is being executed, which is a relevant expression for Q. Note the single table expressions $e_2$=(o_orderpriority='HIGH') and $e_3$=(c_mktsegment='AUTOMOBILE') are also relevant expressions for Q. Suppose that $e_1$ is executed and the execution plan for $e_1$ chosen by the optimizer is the one shown in FIG. 4. In particular, FIG. 4 illustrates obtaining cardinalities of multiple expressions by executing a single expression. Observe that at the end of the execution of this plan, cardinalities of the expressions $e_1$, $e_2$, and $e_3$ are obtained using query execution feedback. As a result, there is no need to execute expressions $e_2$ and $e_3$ separately.

Figure 5:
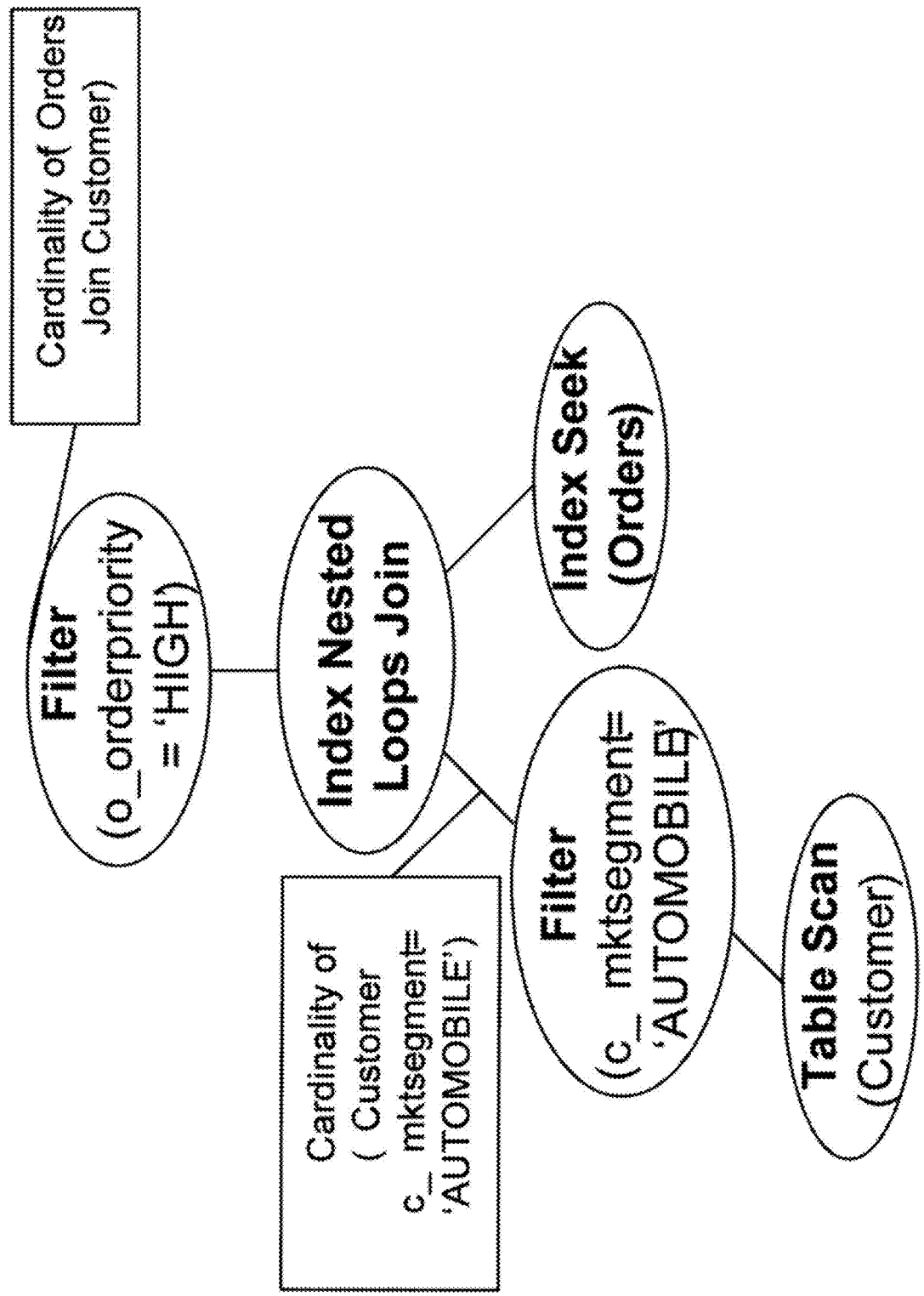
FIG. 5 is an example that illustrates how cardinalities available from feedback vary with the execution plan.

Of course, the set of cardinalities that are available using query execution feedback is a function of the execution plan. For example, assume that instead of the plan shown in FIG. 4 the query optimizer 140 had picked the plan shown in FIG. 5. Specifically, FIG. 5 is an example that illustrates how cardinalities available from feedback vary with the execution plan. Note that FIG. 5 as compared to FIG. 4, FIG. 5 is an Index Nested Loops Join plan instead of Hash Join plan. Observe that cardinalities of e1 and e3 are obtained but not the cardinalities of e2. This is because the filter (o_orderpriority=_HIGH') is applied after the join. In general, query execution feedback can be exploited to obtain the cardinality of every operator in the plan and not just the cardinality of the root operator (or the entire expression). Using the above idea, embodiments of the exact cardinality query optimization system 100 reduce the time taken for exact cardinality query optimization. This is the general idea behind the covering queries optimization technique.

More specifically, let e be a relevant expression for a query, denoted as Q. Let Feedback(e) be the subset of $R_Q$ (the relevant expressions of Q) that can be obtained using execution feedback by executing the plan for expression e. Note that for a given database and optimizer, an expression e uniquely determines its plan, and hence Feedback(e). Let Cost(e) denote the optimizer estimated cost of executing expression e. It can be observed that both Feedback(e) and Cost(e) can be computed by analyzing the execution plan for the expression as discussed previously.

The covering queries optimization problem can now be stated as follows. First, find $R \subset R_Q$ such that $R_Q = \cup_{e \in R} \text{Feedback}(e)$ and $\Sigma_{e \in R} \text{Cost}(e)$ is minimized. In other words, it is desirable to find a subset R of $R_Q$ such that by executing each expression in R, the cardinality of all expressions in $R_Q$ can be obtained. Among all such subsets it is desired to find the one with the lowest optimizer estimated total cost.

The covering queries optimization problem is a nondeterministic polynomial-time hard (NP-Hard). As is known to those of ordinary skill in the art, a problem is NP-hard if and only if there is an NP-Complete problem L that is polynomial time Turing-reducible to H. In other words, L can be solved in polynomial time by an oracle machine with an oracle for H. That the covering queries optimization problem is NP-hard can be proven by reduction from the Set Cover problem. As also is known to those having ordinary skill in the art, the Set Cover problem is a classical question in computer science and complexity theory that has an input several sets that may have some elements in common. A minimum number of these sets must be selected so that the sets picked contain all the elements that are contained in any of the sets in the input.

Given this hardness result it is desirable to find an approximation algorithm for the covering queries optimization problem. Note that the reduction from the Set Cover problem requires that Cost(e) for all expressions is the same. Since in the covering queries optimization problem the cost of executing expressions can vary significantly, the method instead uses the weighted version of the Set Cover problem for the purposes of leveraging an approximation algorithm.

In the Weighted Set Cover problem there is given a universe U of n elements, and another set S containing subsets of U. Each s∈S has a weight w(s) associated with it. The method seeks to find a subset S' ⊂ S with minimum $\Sigma_{s \in S'} w(s)$ such that $U = \cup_{s \in S'} s$. The universe U in the Weighted Set Cover problem corresponds to $R_Q = \{e_1, e_2, \ldots e_n\}$ which is the set of all relevant expressions of Q. The set S in the Weighted Set Cover problem corresponds to the set {Feedback($e_1$), Feedback($e_2$), ... Feedback($e_n$)}. The weight of each element in S is the optimizer estimated cost of executing expression $e_i$=Cost($e_i$). Thus, since the greedy algorithm for Weighted Set Cover is a ln(n) approximation, the same approximation guarantees apply to the covering queries optimization problem as well (n is the size of the universe U, which in the problem is $|R_Q|$).

Figure 6:
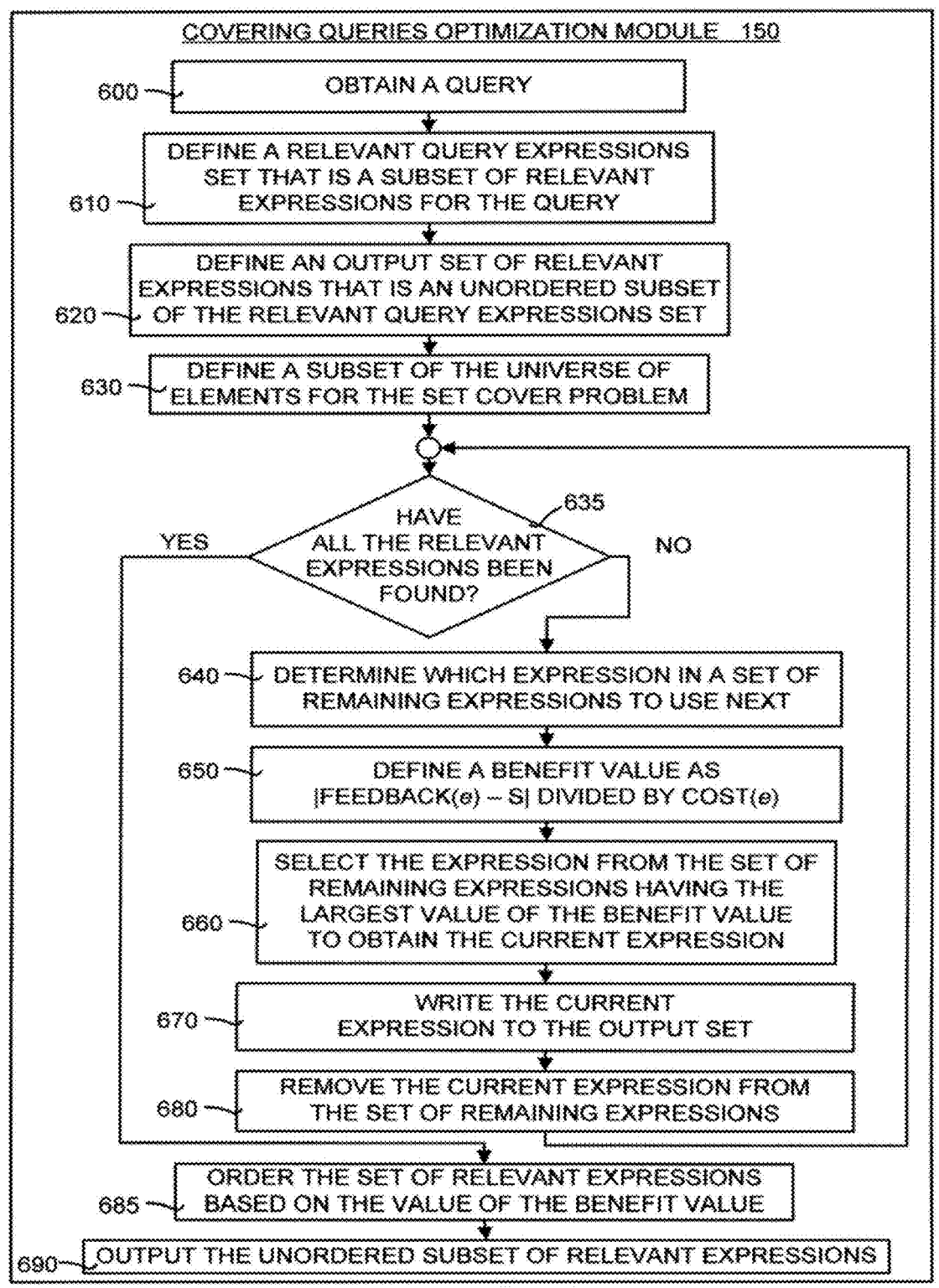
FIG. 6 is a flow diagram illustrating the detailed operation of embodiments of the covering queries optimization module shown in FIG. 1.

FIG. 6 is a flow diagram illustrating the detailed operation of embodiments of the covering queries optimization module 150 shown in FIG. 1. The covering queries optimization module 150 uses a greedy heuristic for Weighted Set Cover. The operation begins by obtaining a query, Q (box 600). Next, a relevant query expressions set, $R_Q$, is defined that is a subset of relevant expressions for the query (box 610). Moreover, an output set of relevant expressions is defined that is an unordered subset of the relevant query expressions set (box 620). Mathematically, this can be expressed as R ⊂ $R_Q$, such that executing all expressions in R gives exact cardinalities for all expression in $R_Q$. As stated above, in the Weighted Set Cover problem there is given a universe U of n elements, and another set S containing subsets of U. At this point in the method both the subset of the universe of elements for the Set Cover problem and the output set of relevant expressions are empty.

A determination then is made as to whether all of the relevant expressions have been found (box 635). This is an iterative loop of the method, with the loop continuing until all cardinalities have been found. In the loop, the method determines which expression in a set of remaining expressions to use next (box 640). Mathematically, this is done by defining a benefit value as |Feedback(e)−S|/Cost(e) (box 650). The method selects the expression from the set of remaining expressions having the largest value of the benefit value to obtain a current expression to use (box 660). This means that the numerator only counts expressions that can be obtained by executing e that are not already in S. Note that |Feedback(e)−S| equals a number of other expressions obtained when the current expression is executed. The benefit value is a ratio of the number of expressions that obtained divided by the cost of executing that expression.

The current expression then is written to the output set (box 670), and the current expression is removed from the set of remaining expressions (box 680). Once all of the relevant queries have been found, then the expressions in the output set of relevant expressions are ordered based on the value of each benefit value associated with that expression (box 685). The unordered subset of relevant expressions then is output (box 690). The method outputs the unordered subset of relevant expressions which is a set of expressions R such that by executing those expressions exact cardinalities can be obtained for all relevant expressions of the query, Q.

III.C. Early Termination

Figure 7:
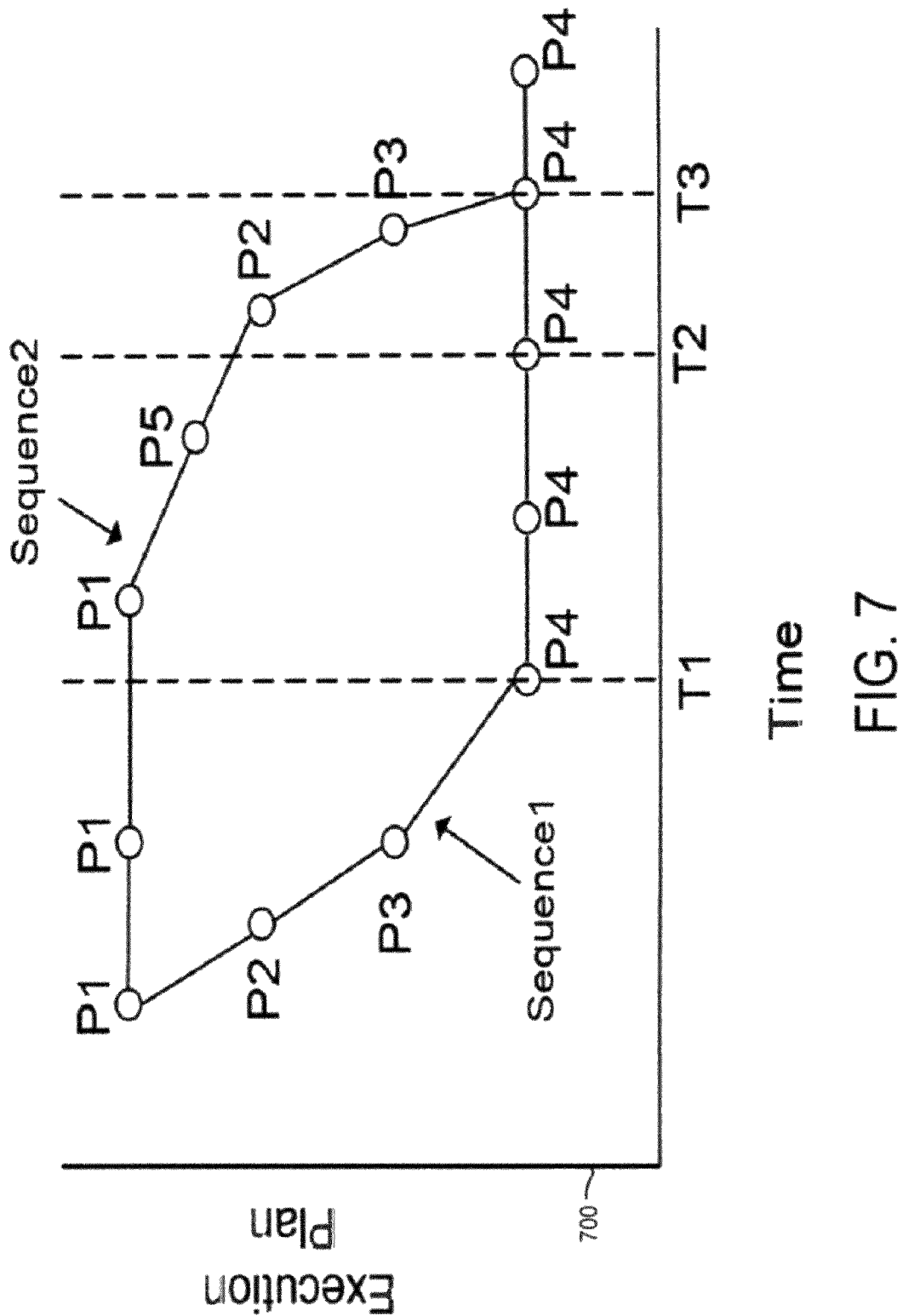
FIG. 7 illustrates an example of convergence and early termination for a query in which the number of relevant expressions is 8.

In general, it may not be necessary to obtain exact cardinalities of all relevant expressions in order to ensure the cardinality-optimal query execution plan 130. In particular, once the exact cardinalities of certain expressions are available, the query optimizer can select the cardinality-optimal query execution plan 130 and not change its choice thereafter. FIG. 7 illustrates an example of convergence and early termination for a query in which the number of relevant expressions is 8. In FIG. 7, the graph 700 plots how the sequence of plans varies after each iteration in which an additional exact cardinality is obtained. Of course, the sequence of plans obtained is dependent on the order in which the expression cardinalities are obtained. FIG. 7 illustrates two such sequences which differ in their ordering of expressions.

Referring to FIG. 7, consider Sequence 1 in the graph. Sequence 1 shows how the cardinality-optimal query execution plan 130 (P4) is reached after the 4th expression's cardinality is obtained. Intuitively, convergence is time at which the query optimizer reaches the cardinality-optimal query execution plan 130 (after obtaining a subset of the cardinalities) and does not change its choice thereafter.

If the query optimizer 140 has converged to the cardinality-optimal query execution plan 130, it also enables the possibility of early termination of exact cardinality query optimization. Thus, it may not be necessary to execute all expressions identified using the covering queries optimization technique described above. Of course, early termination is only possible if the fact that the plan choice is not sensitive to cardinalities of remaining expressions can be detected. FIG. 7 also shows (for Sequence 1) that if at time T2 (after the 6th iteration) the above condition can be detected, then exact cardinality optimization can be terminated, thereby saving the cost of the last two iterations. This is the basis for the early termination technique. The early termination technique includes a technique for detecting a sufficient condition that allows early termination for a common class of queries. For an arbitrary query this technique can be used as a heuristic.

The covering queries optimization technique presented above identifies a subset $R \subseteq R_Q$ (of the relevant expressions of the query) such that by executing the expressions in R, the cardinalities of all expressions in $R_Q$ can be obtained. However, in many cases once the exact cardinalities of certain expressions are made available to the query optimizer 140, its plan choice converges to the cardinality-optimal query execution plan 130 and does not change thereafter. To illustrate this point, consider the following example:

Example 2

Let Q be the query: SELECT E.EmployeeName, D.DeptName FROM Employees E. Department D WHERE E.DeptId=D.DeptId AND E.Age<30 AND E.Salary>200K. Assume that there is an index on E.Salary column and no index on the E.Age column. Consider the case when the accurate cardinality values for all expressions have been obtained except for the expression (E.Age<30). Further assume that the fraction of Employees satisfying the predicate (E.Salary>200K) is very small. In such a cases the execution plan chosen by the optimizer (that uses the index on E.Salary) is not likely to change even if the accurate cardinality is obtained for (E.Age<30).

Thus, if it can be detected that the plan choice is insensitive to the remaining cardinalities to be obtained, then early termination can be enabled to further improve the efficiency of exact cardinality query optimization. The early termination technique uses a modified version of a sensitivity analysis test. The original sensitivity analysis test first will be reviewed, and then the two modifications used in by early termination technique will be presented. Next, the complete algorithm for exact cardinality optimization that incorporates both the covering: queries optimization technique and the early termination technique will be presented. The early termination technique significantly improves the efficiency of embodiments of the exact cardinality query optimization system 100

III.C.1. Test for Detecting Early Termination

The early termination technique builds upon the idea of a Magic Number Sensitivity Analysis (MNSA) that is known to those having ordinary skill in the art. As a review, the goal of the MNSA is to automatically identify a set of sufficient statistics on base tables for a given query. In other words, to identify a subset of all relevant statistics such that the execution plan produced by the query optimizer 140 with the subset is the same as the plan produced if all relevant statistics had been actually created. The key challenge is to make this determination without having to actually build all the relevant statistics.

The MNSA is a test that detects whether the existing set of statistics is sufficient. The MNSA leverages the observation that when statistics on a column are not available, the optimizer uses "magic numbers" (or guesses) for the cardinalities of predicates on that column. Suppose S is the set of single-table expressions where the optimizer is forced to use magic numbers to estimate the cardinality. The MNSA test requires making two calls to the query optimizer. In the first call each cardinality for the expressions in the set S above is assigned a small value $|T|*\epsilon$, (e.g. $\epsilon=0.005$) and a plan is obtained ($P_{low}$). In the second call, all cardinalities for such variables is assigned to a high value $|T|*(1-\epsilon)$ and a plan $P_{high}$ is obtained. If $P_{low}=P_{high}$ then the test returns true.

Thus, in effect the MNSA test changes the magic numbers the optimizer 140 uses to two different extreme values and check whether the execution plans are identical at those two extreme points. The correctness of the MNSA test requires the following conditions to hold. First, the query optimizer estimated cost of the query is monotonic in the size of the cardinalities of the relevant expressions. This is referred to as the cost monotonicity property. Second, each optimizer estimated cost has at most one plan associated with it for the query. These are, by and large, reasonable assumptions and have been shown to hold in several real-world queries.

III.C.2. Extensions to the MNSA Test

The early termination technique uses two important extensions to the MNSA test that can improve the chances of success for the MNSA test. The first extension is a variant of the test which is referred to as Dynamic MNSA. Dynamic MNSA exploits the cardinalities of expressions that have already been obtained thus far to establish bounds on the cardinalities of expressions for which exact cardinalities have not yet been obtained. The second extension is to augment the MNSA test to include an additional necessary condition that can help reduce the false positives of the technique for the rare scenarios where the required assumptions may not hold. These two extensions that provide the basis for the early termination technique now will be discussed in detail.

III.C.2.a. Dynamic MNSA

Dynamic MNSA exploits bounds on the cardinalities of expressions for which exact cardinalities are not available. It should be noted that Dynamic MNSA also requires that the two assumptions described above in relation to the original MNSA test still hold.

Consider single-table expressions on a table T. Observe that the MNSA test assumes that the actual cardinality of all expressions (for which accurate cardinalities are not available) have a value between $[|T|*\epsilon, |T|*1-\epsilon]$. Specifying such a large range is necessary because in the absence of any statistics, it must be conservatively assumed that the cardinalities may lie anywhere in this range. However, the selling of exact query cardinality optimization enables cardinalities of different expressions to be obtained using execution feedback. This opens up the possibility of obtaining improved bounds on the cardinalities of expressions which can be incrementally refined with each additional execution.

Suppose for each expression e the lower and upper bounds LB(e) and UB(e), respectively, could be identified for its cardinality. In the Dynamic MNSA test, each expression whose actual cardinality is not available its LB(e) (resp. UB(e)) in the first (resp. second) optimizer call can be used in order to compute $P_{low}$ and $P_{high}$. The fact can then be exploited that after each expression in R is executed additional exact cardinalities are obtained, which can be used to refine (or tighten) the upper and lower bounds of related expressions. Clearly, the tighter these bounds get, the greater is the likelihood of the above early termination test (when $P_{low}=P_{high}$) succeeding. Observe that the correctness of the test is unaffected since by definition the actual cardinality of an expression is guaranteed to lie between its bounds. The effectiveness of this technique therefore depends on how tight the bounds can be made.

III.C.2.a.i. Initialization and Refinement of the Lower and Upper Bounds

It will now be described how the lower bounds LB(e) and the upper bounds UB(e) are initialized and refined.

Initialization

For single-table expressions, the lower bound is initialized to 0 and the upper bound is initialized to the cardinality of the table. For a key foreign-key (K-FK) join expression, the lower bound is 0 and the upper bound is the cardinality of the FK side input relation. In general for an arbitrary join, the upper bound is the size of the cross product of the two input relations. The bounds initialized as above are accurate but conservative. It should be noted that most database systems maintain accurate single column histograms on base tables. In cases where such a histogram is available and is up to date, the histogram can be used to obtain tighter bounds for single column expressions.

By way of example, consider an expression (l_shipdate between__2008-01-01' and__2008-01-31'). To obtain the UB, a histogram is looked up to identify the two end buckets in which the constants in the predicate appear, and sum the counts of all buckets including the end-buckets. To obtain the LB, only the interior buckets are summed, excluding the end-buckets unless they are fully covered. If no other information is available, then the conservative bounds (as discussed above) are used. These bounds can then be propagated to other expressions as is described below.

Refining Bounds

As described above, expressions belonging to the set of relevant expressions ($R_Q$) are related to one another by parent-child relationships. Knowing this relationship and the algebraic properties of the parent and child expressions, it is possible to use the bounds of a parent (resp. child) to refine the bounds of the child (resp. parent). For example, algebraic properties of expressions that are exploited are: (a) For a selection or group-by expression, the output cardinality cannot exceed the cardinality of the child expression. Conversely, the cardinality of the child must be at least as large as the cardinality of the parent. (b) For a K-FK join expression, the output cardinality cannot exceed the cardinality of the FK-side child. Conversely, the cardinality of the FK-side child must be a least as large as the cardinality of the parent. (c) For an arbitrary join expression, the cardinality cannot exceed the product of the cardinalities of the two child expressions.

Figure 8:
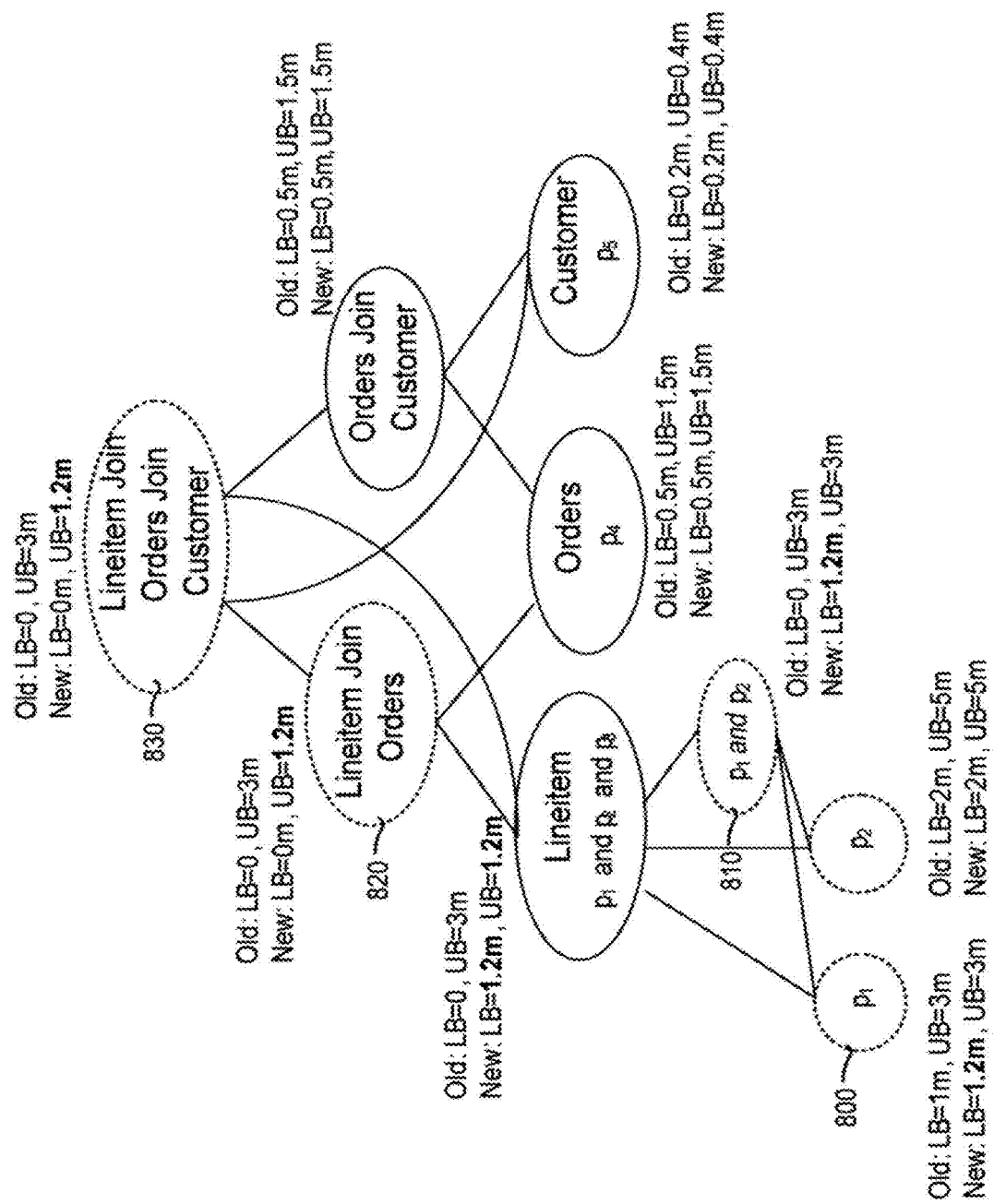
FIG. 8 illustrates an example of refining bounds based on an expression.

Referring back to memo for the query in Example 1, consider the case where the exact cardinality of the expression (Lineitem p1 and p2 and p3) has been obtained (say 1.2 million rows). FIG. 8 illustrates an example of refining bounds based on an expression. In FIG. 8, the nodes whose bounds can be refined as a result are outlined in dotted lines. These include the lower bound (LB) of expressions ($p_1$) 800 and ($p_1$ and $p_2$) 810 as well as the upper bound (UB) of the expressions (Lineitem ⋈ Orders) 820 and (Lineitem ⋈ Orders ⋈ Customer) 830. With each node FIG. 8 also shows that the LB and UB before and after the corresponding bounds are refined. Thus, with each additional execution, there is a potential to dynamically modify the bounds of the cardinalities for expressions that have not been obtained.

Note that whenever the original MNSA test succeeds that this extensions of the original MNSA test is also guaranteed to succeed. However, the converse is not true. Thus, the Dynamic MNSA test is strictly more efficient. Unlike the static setting of the original MNSA test where there is no access to execution feedback (and thus the bounds have to be set conservatively to ensure soundness), execution feedback can be leveraged to obtain tighter bounds. Experiments have indicated that using bounds can significantly improve the effectiveness of the original MNSA test.

III.C.2.b. Adding a Condition to the MNSA Test

Recall that the original MNSA test uses two optimizer calls to obtain two plans $P_{low}$, and $P_{high}$ and checks whether $P_{low}=P_{high}$. The Dynamic MNSA test (that incorporates bounds) for embodiments of the exact cardinality query optimization system 100 works as follows. Let S denote the set of cardinalities obtained thus far. Let $P_{LB}$ denote the plan obtained using exact cardinalities for all elements in S and LB(e) for all expressions in ($R_Q$–S). Let $P_{UB}$ be the corresponding plan derived using UB(e) for all expressions in ($R_Q$–S). The early termination technique describe above determines whether $P_{LB}=P_{UB}$.

This check is augmented by including an additional necessary condition. In particular, in some embodiments this condition is that a query execution plan is obtained where a subset of the cardinalities is known to be accurate. In alternate embodiments, a query execution plan is obtained where each of the cardinalities is accurate. In particular, let $P_{curr}$ denote the plan obtained by using exact cardinalities for all elements in S and the optimizer estimated cardinalities for all elements in ($R_Q$–S). Note that this would be the plan returned by the exact cardinalities query optimization system 100 if it were to terminate at this point. In some embodiments the early termination condition is augmented to check whether $P_{LB}=P_{curr}=P_{UB}$. In other embodiments, this early termination condition can be tested at any points between the lower bound ($P_{LB}$) and the upper bound ($P_{UB}$). These points in between the lower and upper bounds can be pre-determined point or random points. In other embodiments, the early termination can be extended to check the plans at an additional number of set of points that lie between the lower bound ($P_{LB}$) and the upper bound ($P_{UB}$) values and the test is deemed to succeed only if all the plans are identical. These additional checks are included in the early termination technique to ensure that the plan being returned as the cardinality-optimal query execution plan 130 is indeed the same plan at the two extreme points ($P_{LB}$ and $P_{UB}$). Of course, in cases where the original assumptions of the MNSA test are known to hold, this test is guaranteed to succeed. However, for the rare scenarios where the assumptions do not hold, it has been observed that this additional check can be useful to reduce any false positives.

III.C.3. Algorithm for ECQO Problem Using Early Termination

The early termination technique can be incorporated into embodiments of the exact cardinality query optimization system 100 that use the covering queries optimization technique. The exact cardinality query optimization method used by the system 100 loops through the set of expressions obtained using the Covering Queries Optimization technique in the descending order of "benefit," which is denoted by B(e). Details of the B(e) function are described in detail below in conjunction with ordering expressions. The MNSA test is applied to see if early termination is possible. Note that the correctness of the early termination technique is independent of the ordering of expressions. If not, the expression e is executed and the feedback is obtained. The exact cardinalities obtained via execution feedback are used to refine the upper and lower bounds of other relevant expressions in the memo. The exact cardinality query optimization technique is guaranteed to be correct when the two assumptions described above hold.

Figure 9:
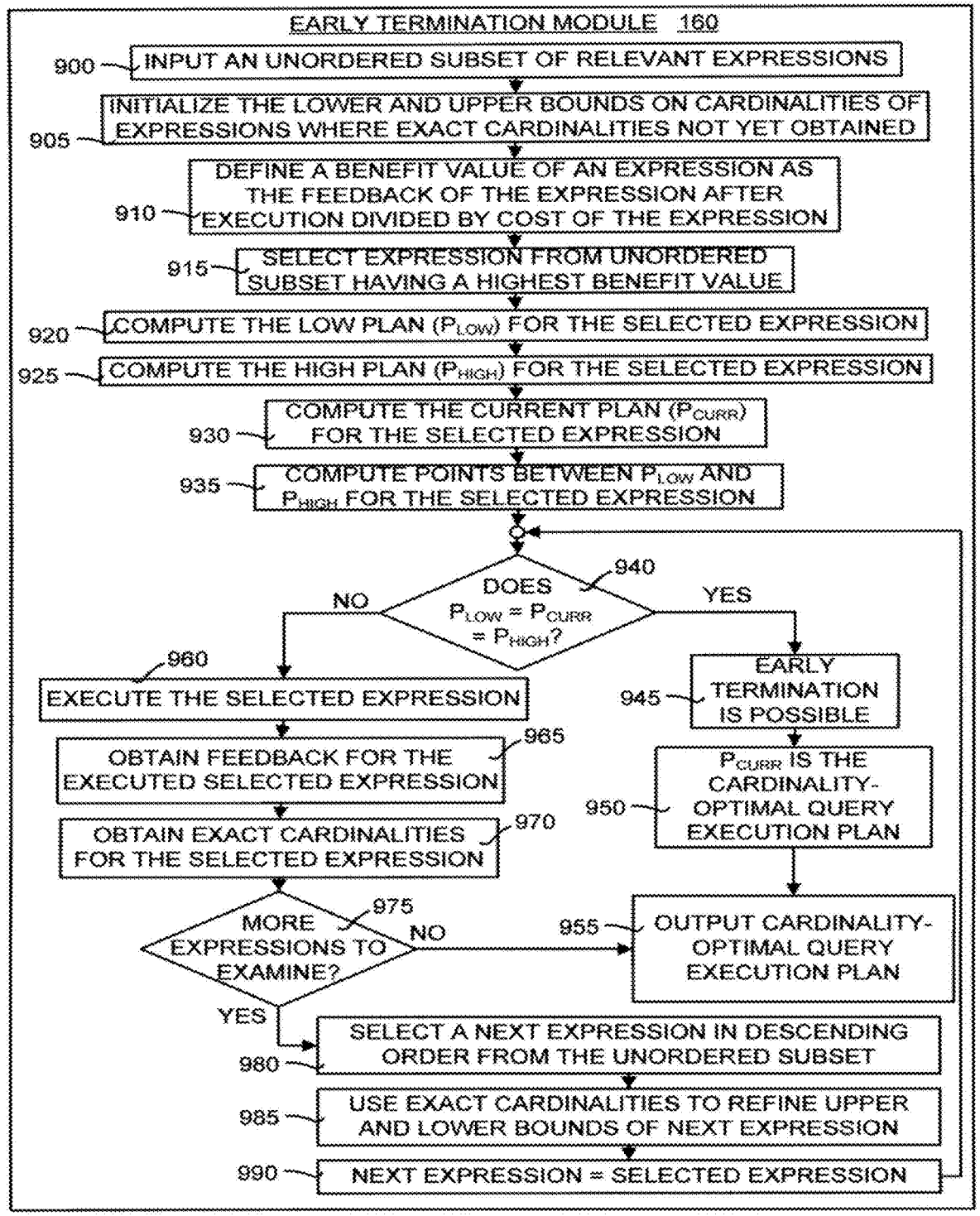
FIG. 9 is a flow diagram illustrating the detailed operation of embodiments of the early termination module shown in FIG. 1.

FIG. 9 is a flow diagram illustrating the detailed operation of embodiments of the early termination module 160 shown in FIG. 1. The operation begins by inputting the unordered subset of relevant expressions obtained using the covering queries technique (box 900). As described above, the lower and upper bounds on cardinalities of expression in the ordered set are initialized where exact cardinalities have not yet been obtained (box 905). Next, a benefit value of an expression is defined as the feedback of the expression after execution divided by the cost of the expression (box 910). This formula is given mathematically below.

The module 160 then selects an expression having the highest benefit value from the unordered subset (box 915). Next, as described above, a low plan ($P_{low}$), a high plan ($P_{high}$) and a current plan ($P_{curr}$) are computed (boxes 920, 925, 930). In some embodiments, a point or points between the low plan and the high plan is computed (box 935). In other words, a plan or an additional set of plans at intermediate points between the lower bound values and the upper bound values can be computed. The module 160 checks if these set of plans are all identical. The module 160 then makes a determination as to whether $P_{low} = P_{curr} = P_{high}$ (box 940). If so, then early termination is possible (box 945). This means that $P_{curr}$ is the cardinality-optimal query execution plan 130 (box 950). This cardinality-optimal query execution plan 130 is output (box 955).

If the determination is negative, then the selected expression is executed (box 960) and feedback is obtained for the executed selected expression (box 965). In addition, the module 160 obtains the exact cardinalities for the selected expression (box 970). A determination then is made as to whether there are additional expressions to examine (box 975). If not, then the cardinality-optimal query execution plan 130 is output (box 955). Otherwise, a next expression is selected in descending order (or having the next highest benefit value) from the unordered subset (box 980). Moreover, the exact cardinalities are used to refine the upper and the lower bounds of the next expression (box 985). The next expression then is designated as the selected expression (box 990).

III.D. Expressions Ordering

Referring again to FIG. 7, it can also be seen how choosing an appropriate order of executing expressions can make a difference. For instance, in contrast to Sequence 1, Sequence 2 converges to the cardinality-optimal query execution plan 130 only at time T3. Ideally, an ordering should be selected that enables convergence to the cardinality-optimal query execution plan 130 as soon as possible. While choosing such an optimal ordering is a difficult problem, the expressions ordering module 170 shown in FIG. 1 includes techniques for ordering expressions. These expressions ordering techniques include a heuristic for ordering expressions that can improve convergence significantly relative to picking a random order. While the above heuristic can be applied to an arbitrary query, the heuristic can also be used to further improve convergence for the special but important case of an instance of a stored procedure or parameterized query. Since the set of relevant expressions for any two instances of the same stored procedure is the same (modulo the constants), it is possible to leverage information from one or more instances for which exact cardinality query optimization has been previously performed to improve the convergence for a new instance of the same stored procedure.

Choosing an appropriate order of executing expressions can have a significant impact on the convergence. Ideally, the order selected would facilitate convergence to the cardinality-optimal query execution plan 130 in the shortest possible time. While choosing such an optimal ordering is a difficult problem, the expressions ordering technique used by the expression ordering module 170 uses certain techniques to pick an appropriate order.

In the following discussion a heuristic is presented for ordering expressions. While this heuristic can be applied to an arbitrary query, it is also possible to further improve convergence for the special but important case of an instance of a stored procedure. Since the set of relevant expressions for any two instances of the same stored procedure is the same (modulo the constants), it is shown how it is possible to leverage information from one or more instances for which exact cardinality query optimization has been performed to influence the ordering of expressions to improve the convergence for a new instance of the same stored procedure.

III.D.1. Heuristic for Ordering Expressions

Note that the covering queries optimization technique returns a subset R of $R_Q$ that needs to be executed in order to obtain all relevant expressions. A simple technique would be to choose expressions in R using a random order. The expressions ordering technique is based on two syntactic properties of an expression e. First, the number of expression cardinalities obtained when the expression is executed (or Feedback (e)). Second, the cost of executing that expression, Cost(e).

The expressions ordering technique uses the heuristic that is based on the algorithm used for the covering queries optimization technique. Namely, expressions are ordered in descending order of "benefit" as defined by the equation, $$B(e) = |\text{Feedback}(e)|/\text{Cost}(e).$$

Experiments have shown that using the above B(e) metric is significantly better than using a random ordering. While this heuristic is based on purely syntactic criteria, the next section discusses how information about the importance of an expression can be leveraged based on exact cardinality query optimization of previous queries.

III.D.2. Ordering Expressions for Stored Procedure Instances

Stored procedures (or parameterized queries) are commonly used by database applications. Note that all queries that are instances of the same stored procedure share the same set of relevant expressions modulo the constants. Interestingly, it has been observed that in many cases once the cardinalities of a few essential expressions have been obtained, the query optimizer can converge to the cardinality-optimal query execution plan 130. This is similar to Sequence 1 shown in FIG. 7.

By way of example, consider a new instance of a stored procedure for which its cardinality-optimal query execution plan 130 needs to be computed. The general idea is to whether it can be determined what the essential cardinalities for this query instance are by leveraging the execution of previous instances. Of course, as a prerequisite it must first be understood what the essential cardinalities were for the query instances that have previously been executed. The expressions ordering technique exploits a posteriori analysis of exact cardinality query optimization for this purpose. The cost of the a posteriori analysis, which is described below, is typically a small fraction of the cost of exact cardinality optimization. This information then is leveraged to influence the ordering of expressions for a new instance of the stored procedure.

III.D.2.a. Computing Essential Set of Expression Cardinalities

Consider an instance Q of a stored procedure for which exact cardinality query optimization has already been performed. Let S be the set of expressions for which exact cardinalities were obtained (Plan(Q,S)=Plan(Q,$R_Q$). Given that the cardinality-optimal query execution plan P is known, the set S of cardinalities can be analyzed to determine a subset, E ⊂ S, that would have been sufficient to obtain the cardinality-optimal query execution plan 130. Note that the crucial difference from the setting for the early termination technique described above is the fact that in this a posteriori analysis there is no access to the cardinality-optimal query execution plan 130.

Definition 1: Essential set of expressions for obtaining the cardinality-optimal query execution plan 130. Given a query Q and a set of expressions S for which accurate cardinalities were computed, an essential set of expressions of query is a subset E of S such that Plan(Q, E)=Plan(Q, S) and this property is not true for any proper subset of E. The notation ES(Q) is used to denote the essential set of a query.

It can be observed that for many queries the essential set is typically much smaller in size than the set of relevant expressions. Generally, the essential set of expressions for different queries can vary considerably. However, since queries that are instances of the same stored procedure share the same set of relevant expressions, there is the opportunity of leveraging the essential set information of previous queries that are instances of the same stored procedure. This is the basis of reordering expression using essential set information.

III.D.2.b. Reordering Expressions Using Essential Set Information

Consider a set W of queries that are all instances of the same stored procedure. Assume that the cardinality-optimal query execution plan 130 and the corresponding essential sets for these queries have already been computed. Consider a new instance Q of the same stored procedure. Ideally, if the essential set of Q was known in advance then ordering the expressions such that the cardinality of the expressions that belong to ES(Q) are obtained first could significantly help improve the convergence of Q. This is especially important if the size of ES(Q) is much smaller than $R_Q$. Thus, a key question is whether the essential set information for queries in W can be exploited to help identify expressions that are likely to belong to ES(Q). In general, instances of the same stored procedure can potentially have very different essential sets, since the constants used in the query can result in vastly different cardinalities. It can be observed, however, that the instances can be partitioned such that the groups obtained have "similar" essential sets. Then, at query optimization time for a new query instance, the query is mapped to an existing group and greater priority is given to expressions that belong to the essential set of one or more queries in that group.

Figure 10:
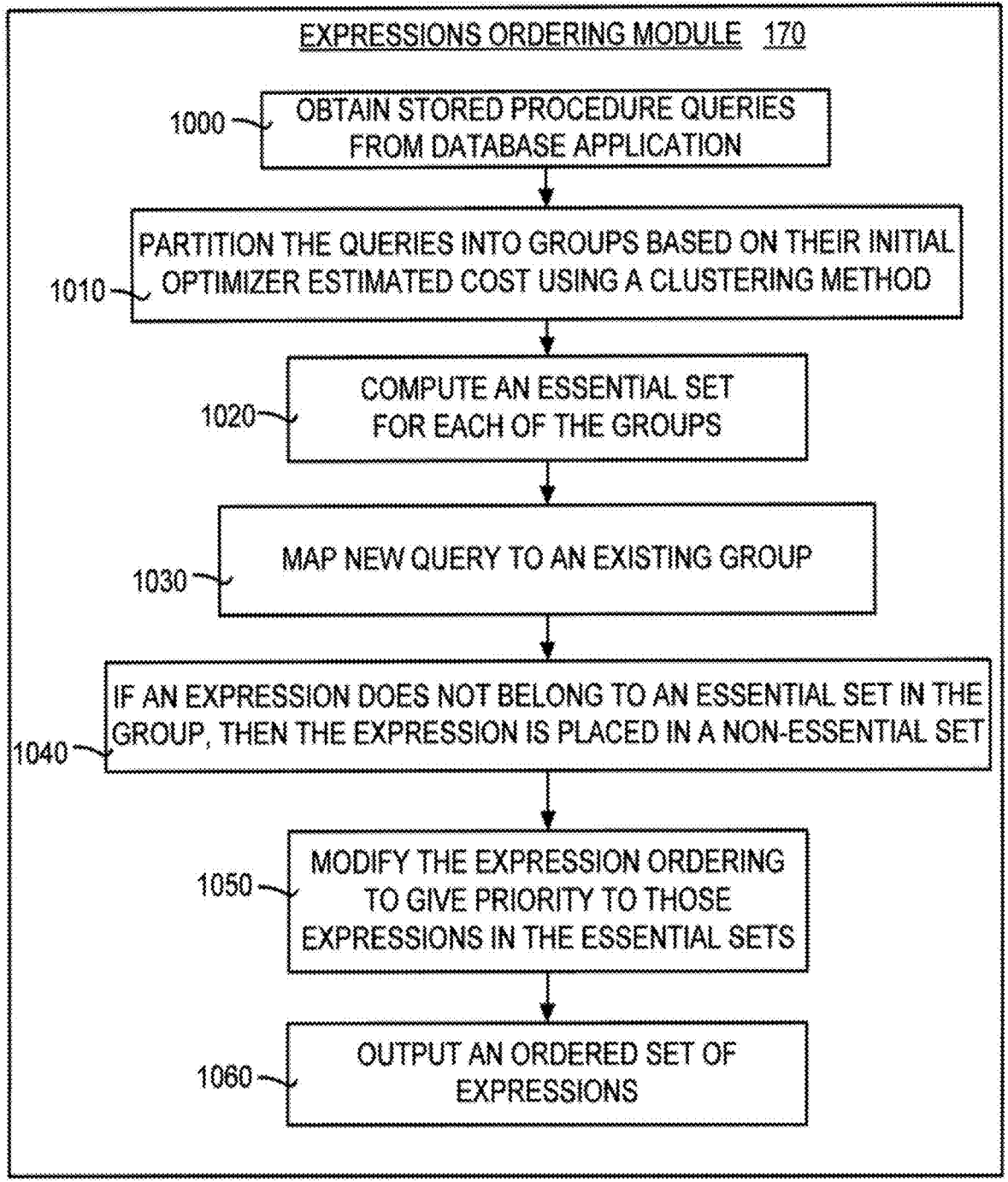
FIG. 10 is a flow diagram illustrating the detailed operation of embodiments of the expressions ordering module shown in FIG. 1.

FIG. 10 is a flow diagram illustrating the detailed operation of embodiments of the expressions ordering module 170 shown in FIG. 1. In general, the expressions ordering technique used by the expressions ordering module 170 contains a partitioning phase and a query optimization phase. Each of these phases will now be discussed in conjunction with FIG. 10.

III.D.2b.i. Partitioning Phase

The expressions ordering technique begins by obtaining stored procedure queries from a database application (box 1000). A determination then is made as to how the queries should be partitioned. As an initial heuristic, the queries are partitioned based on their initial optimizer estimated cost. This means that the module 170 partitions the queries into groups based on their initial optimizer estimated cost (box 1010). This is performed using a clustering method. In some embodiments, a k-means clustering algorithm is used for this step (where k is an input parameter). It should be noted that in alternate embodiments other clustering methods or techniques for histogram construction could also be used instead. Intuitively, only the essential set information for groups is aggregated whose queries had some expressions in common in their essential sets. Thus, for each group of queries G, the essential set of a group (denoted as ES(G)) is computed (box 1020). Mathematically, an essential set of a group is defined as follows. If the intersection of the essential sets of the queries belonging to the group G is empty then ES(G) is defined to be null. If the intersection is non-empty then ES(G) is defined by the equation:

$$ES(G) = \bigcup_{Q \in G} ES(Q).$$

III.D2.b.ii. Query Optimization

For a new query the query is first mapped to an existing group (box 1030). If an expression does not belong to an essential set of the group, then the expression is placed in a nonessential set (box 1040). Since the groups are partitioned based on the initial optimizer estimated cost, the group G that a new query instance belongs to can be efficiently located. Note that if the essential set of Q is identical to ES(G), then the order of execution could be modified to give priority to those expressions that occur in ES(G). Using this intuition, for each expression e, if e belongs to ES(G), then Essential(e)=1 is defined. Otherwise, Essential(e)=0 is defined.

The module 170 then modifies the expression ordering to give priority to those expressions in the essential sets (box 1050). Recall from above that the measure B(e) was used to the order of execution of expressions. The expressions are now ordered using the modified function B'(e)=(Essential(e), B(e)). In effect, the expressions are divided into two categories (namely, essential and non-essential) while giving priority to expressions that are essential. Within each category, the expressions are ordered by the original B(e) function. Note that if the query maps to a group G where ES(G) is null, then B'(e) is equivalent to the original ordering B(e). Experiments have shown that using the query optimization technique can result in substantial improvements in convergence for stored procedure instances compared to using the B(e) function given above. The output of the module 170 is an ordered set of expressions (box 1060).

IV. Exemplary Operating Environment

Embodiments of the exact cardinality query optimization system 100 and method are designed to operate in a computing environment. The following discussion is intended to provide a brief, general description of a suitable computing environment in which embodiments of the exact cardinality query optimization system 100 and method may be implemented.

Figure 11:
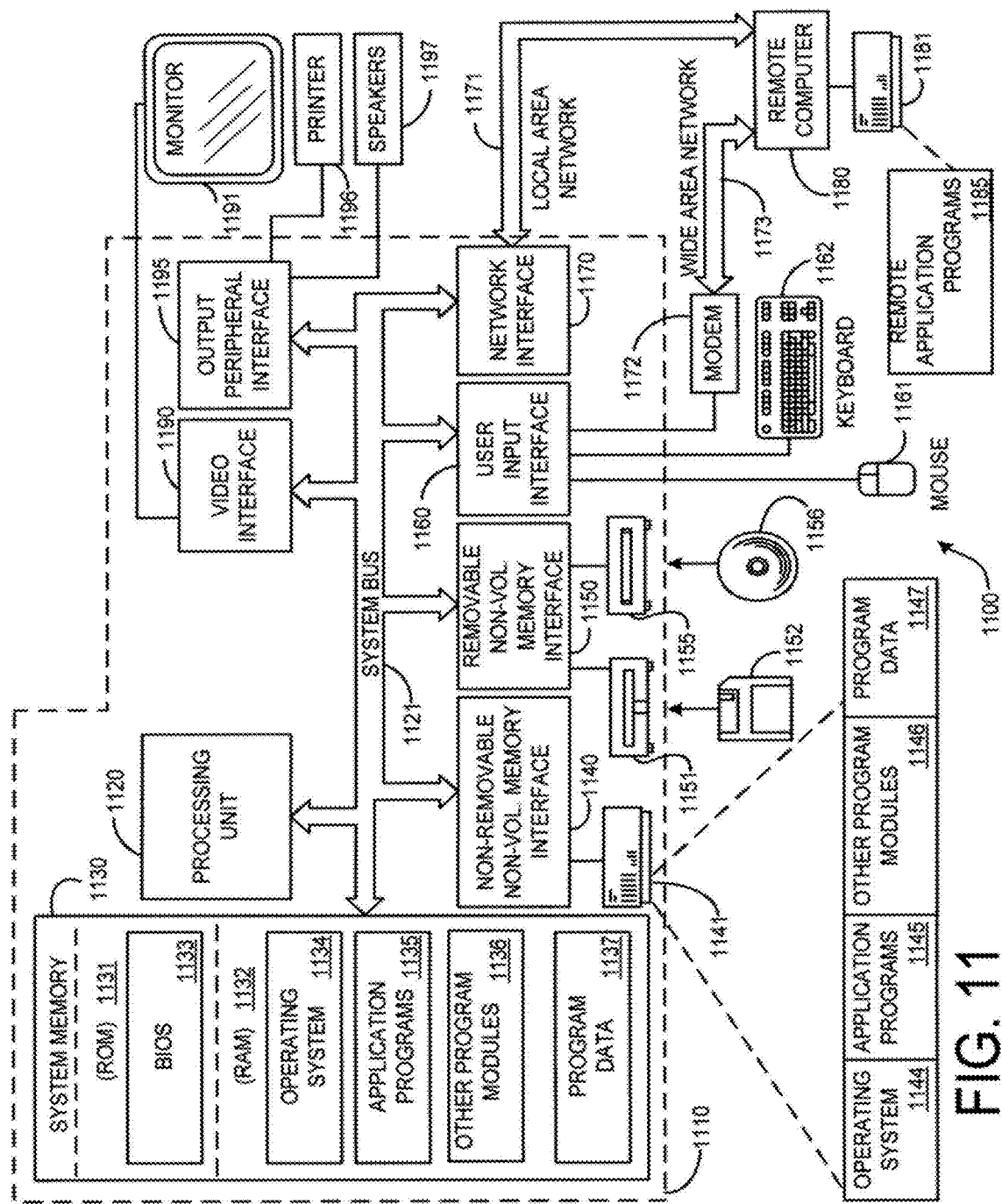
FIG. 11 illustrates an example of a suitable computing system environment in which embodiments of the exact cardinality query optimization system and method shown in FIGS. 1-10 may be implemented.

FIG. 11 illustrates an example of a suitable computing system environment in which embodiments of the exact cardinality query optimization system 100 and method shown in FIGS. 1-10 may be implemented. The computing system environment 1100 is only one example of a suitable computing environment and is not intended to suggest any limitation as to the scope of use or functionality of the invention. Neither should the computing environment 1100 be interpreted as having any dependency or requirement relating to any one or combination of components illustrated in the exemplary operating environment.

Embodiments of the exact cardinality query optimization system 100 and method are operational with numerous other general purpose or special purpose computing system environments or configurations. Examples of well known computing systems, environments, and/or configurations that may be suitable for use with embodiments of the exact cardinality query optimization system 100 and method include, but are not limited to, personal computers, server computers, hand-held (including smartphones), laptop or mobile computer or communications devices such as cell phones and PDA's, multiprocessor systems, microprocessor-based systems, set top boxes, programmable consumer electronics, network PCs, minicomputers, mainframe computers, distributed computing environments that include any of the above systems or devices, and the like.

Embodiments of the exact cardinality query optimization system 100 and method may be described in the general context of computer-executable instructions, such as program modules, being executed by a computer. Generally, program modules include routines, programs, objects, components, data structures, etc., that perform particular tasks or implement particular abstract data types. Embodiments of the exact cardinality query optimization system 100 and method may also be practiced in distributed computing environments where tasks are performed by remote processing devices that are linked through a communications network. In a distributed computing environment, program modules may be located in both local and remote computer storage media including memory storage devices. With reference to FIG. 11, an exemplary system for embodiments of the exact cardinality query optimization system 100 and method includes a general-purpose computing device in the form of a computer 1110.

Components of the computer 1110 may include, but are not limited to, a processing unit 1120 (such as a central processing unit, CPU), a system memory 1130, and a system bus 1121 that couples various system components including the system memory to the processing unit 1120. The system bus 1121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 1110 typically includes a variety of computer readable media. Computer readable media can be any available media that can be accessed by the computer 1110 and includes both volatile and nonvolatile media, removable and non-removable media. By way of example, and not limitation, computer readable media may comprise computer storage media and communication media. Computer storage media includes volatile and nonvolatile removable and non-removable media implemented in any method or technology for storage of information such as computer readable instructions, data structures, program modules or other data.

Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 1110. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 1140 includes computer storage media in the form of volatile and/or nonvolatile memory such as read only memory (ROM) 1131 and random access memory (RAM) 1132. A basic input/output system 1133 (BIOS), containing the basic routines that help to transfer information between elements within the computer 1110, such as during start-up, is typically stored in ROM 1131. RAM 1132 typically contains data and/or program modules that are immediately accessible to and/or presently being operated on by processing unit 1120. By way of example, and not limitation, FIG. 11 illustrates operating system 1134, application programs 1135, other program modules 1136, and program data 1137.

The computer 1110 may also include other removable/non-removable, volatile/nonvolatile computer storage media. By way of example only, FIG. 11 illustrates a hard disk drive 1141 that reads from or writes to non-removable, nonvolatile magnetic media, a magnetic disk drive 1151 that reads from or writes to a removable, nonvolatile magnetic disk 1152, and an optical disk drive 1155 that reads from or writes to a removable, nonvolatile optical disk 1156 such as a CD ROM or other optical media.

Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 1141 is typically connected to the system bus 1121 through a non-removable memory interface such as interface 1140, and magnetic disk drive 1151 and optical disk drive 1155 are typically connected to the system bus 1121 by a removable memory interface, such as interface 1150.

The drives and their associated computer storage media discussed above and illustrated in FIG. 11, provide storage of computer readable instructions, data structures, program modules and other data for the computer 1110. In FIG. 11, for example, hard disk drive 1141 is illustrated as storing operating system 1144, application programs 1145, other program modules 1146, and program data 1147. Note that these components can either be the same as or different from operating system 1134, application programs 1135, other program modules 1136, and program data 1137. Operating system 1144, application programs 1145, other program modules 1146, and program data 1147 are given different numbers here to illustrate that, at a minimum, they are different copies. A user may enter commands and information (or data) into the computer 1110 through input devices such as a keyboard 1162, pointing device 1161, commonly referred to as a mouse, trackball or touch pad, and a touch panel or touch screen (not shown).

Other input devices (not shown) may include a microphone, joystick, game pad, satellite dish, scanner, radio receiver, or a television or broadcast video receiver, or the like. These and other input devices are often connected to the processing unit 1120 through a user input interface 1160 that is coupled to the system bus 1121, but may be connected by other interface and bus structures, such as, for example, a parallel port, game port or a universal serial bus (USB). A monitor 1191 or other type of display device is also connected to the system bus 1121 via an interface, such as a video interface 1190. In addition to the monitor, computers may also include other peripheral output devices such as speakers 1197 and printer 1196, which may be connected through an output peripheral interface 1195.

The computer 1110 may operate in a networked environment using logical connections to one or more remote computers, such as a remote computer 1180. The remote computer 1180 may be a personal computer, a server, a router, a network PC, a peer device or other common network node, and typically includes many or all of the elements described above relative to the computer 1110, although only a memory storage device 1181 has been illustrated in FIG. 11. The logical connections depicted in FIG. 11 include a local area network (LAN) 1171 and a wide area network (WAN) 1173, but may also include other networks. Such networking environments are commonplace in offices, enterprise-wide computer networks, intranets and the Internet.

When used in a LAN networking environment, the computer 1110 is connected to the LAN 1171 through a network interface or adapter 1170. When used in a WAN networking environment, the computer 1110 typically includes a modem 1172 or other means for establishing communications over the WAN 1173, such as the Internet. The modem 1172, which may be internal or external, may be connected to the system bus 1121 via the user input interface 1160, or other appropriate mechanism. In a networked environment, program modules depicted relative to the computer 1110, or portions thereof, may be stored in the remote memory storage device. By way of example, and not limitation, FIG. 11 illustrates remote application programs 1185 as residing on memory device 1181. It will be appreciated that the network connections shown are exemplary and other means of establishing a communications link between the computers may be used.

The foregoing Detailed Description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A method implemented on a general-purpose computing device for optimizing a query, comprising:
    using the general-purpose computing device to perform the following:
        selecting a subset of expressions in a set of relevant expressions of the query such that by executing the selected subset of expressions on a database exact cardinalities of each of the relevant expressions becomes available using at least one of the following techniques:
            a covering queries optimization technique that obtains an unordered subset of relevant expressions for the query that is a subset of a set of relevant expressions for the query;
            an expressions ordering technique that determine in which order to execute expressions in the unordered subset of relevant expressions to obtain an ordered subset of relevant expressions;
            an early termination technique that uses at least some of the expressions in the ordered subset of relevant expressions to determine whether execution of the expressions can be terminated early;
        selecting an expression having a highest benefit value from the subset of expressions to determine whether early termination is possible;
        computing a current execution plan for the selected expression;
        extracting a cardinality-optimal query execution plan without executing each expression in the plan, whereby each expression in the plan has exact cardinalities; and
        optimizing the query using the cardinal-optimal query execution plan.

2. The method of claim 1, further comprising defining a benefit value as:

$$|\text{Feedback}(e)-S|/\text{Cost}(e),$$

where e is an expression in the set of relevant expressions, Feedback(e) is a feedback obtain from executing the expression, S is a set of expressions for which exact cardinalities have been obtained, and Cost(e) is an optimizer estimated cost of executing the expression.

3. The method of claim 1, further comprising initializing a lower bound and an upper bound on cardinalities of expressions in the unordered subset of the subset of relevant expressions where exact cardinalities have not yet been obtained.

4. The method of claim 3, further comprising:
    selecting a point that is between the lower bound and the upper bound; and
    computing an execution plan at the point for the selected expression.

5. The method of claim 1, further comprising:
    computing a low execution plan for the selected expression; and
    computing a high execution plan for the selected expression.

6. The method of claim 5, further comprising:
    determining whether the low execution plan equals the current execution plan; and
    determining whether the high execution plan equals the current execution plan.

7. The method of claim 6, further comprising:
    if a low execution plan and a high execution plan equal the current execution plan, then terminating execution of the expressions in the subset of the set of relevant expressions; and
    defining the current execution plan as the cardinality-optimal query execution plan.

8. The method of claim 6, further comprising:
    if the low execution plan and the high execution plan do not equal the current execution plan, then executing the selected expression;
    obtaining feedback from the executed selected expression; and
    obtaining exact cardinalities for the selected expression.

9. The method of claim 8, further comprising:
    selecting a next expression from the subset of the set of relevant expressions; and
    using the exact cardinalities for the selected expression to refine the lower bound and the upper bound for the next expression.

10. The method of claim 1, further comprising:
obtaining previously executed queries; and
mapping a new query to an existing group.

11. The method of claim 10, further comprising:
defining essential sets for the existing group; and
ordering of the expressions in the unordered subset of the set of relevant expressions to give priority to those expressions contained in the essential sets.

12. A method for obtaining a query execution plan for a query in a database management system on a general-purpose computing device, comprising:
using the general-purpose computing device to compute a subset of relevant expressions that is a portion of a set of relevant query expressions for the query;
initializing a lower bound and an upper bound on cardinalities of expressions in the subset of relevant expressions where exact cardinalities have not been obtained;
selecting an expression having a highest benefit value from the subset of relevant expressions;
computing a low execution plan ($P_{low}$), a high execution plan ($P_{high}$), and a current execution plan ($P_{curr}$);
computing an execution plan for a random point that is between the low execution plan ($P_{low}$) and the high execution plan ($P_{high}$);
determining whether $P_{low}=P_{curr}=P_{high}$;
based on whether $P_{low}=P_{curr}=P_{high}$, determining a cardinality-optimal query execution plan having exact cardinalities for each expression; and
optimizing the query using the cardinal-optimal query execution plan.

13. The method of claim 12, further comprising:
if $P_{low} \neq P_{curr} \neq P_{high}$, then:
executing the selected expression;
obtaining feedback for the executed selected expression;
obtaining exact cardinalities for the selected expression using the feedback; and
using the exact cardinalities to refine a lower bound and an upper bound for a subsequent expression to be processed.

14. The method of claim 12, further comprising:
if $P_{low}=P_{curr}=P_{high}$, then
terminating execution of remaining expressions in the subset of relevant expressions; and
defining $P_{curr}$ as the cardinality-optimal query execution plan.

15. The method of claim 12, further comprising:
selecting an expression from the set of relevant query expressions for the query; and
defining a benefit value as:

|Feedback(e)−S|/Cost(e), where e is an expression in the set of relevant expressions, Feedback(e) is a feedback obtain from executing the expression, S is a set of expressions for which exact cardinalities have been obtained, and Cost(e) is an optimizer estimated cost of executing the expression.

16. The method of claim 15, further comprising:
selecting an expression from a set of remaining expression that have not been executed having a largest value of the benefit value to obtain a current expression; and
including the current expression in the subset of relevant expressions.

17. The method of claim 12, further comprising:
computing a benefit for an expression using the equation:

$B(e)=|Feedback(e)|/Cost(e)$, where Feedback(e) is a subset of set of relevant query expressions for the query that can be obtained using execution feedback by executing the plan for expression e, and Cost(e) is an optimizer estimated cost of executing expression e.

18. A computer-implemented process contained on computer-implemented method contained on computer-readable storage media having stored and encoded thereon computer-executable instructions for execution on a general-purpose computing device for obtaining a query execution plan, comprising:
using the general-purpose computing device to perform the following process actions:
obtaining a query having a plurality of expressions;
defining an unordered subset of relevant expressions that is a subset of each relevant expression in the query;
defining a benefit value to select which expressions to include in the unordered subset of relevant expressions and ordering the expressions in the unordered subset of relevant expressions in an initial ordering to obtain an ordered subset of relevant expressions;
obtaining previously executed queries;
using a clustering technique to group the previously executed queries into groups based on their initial optimizer estimated cost of execution;
defining an essential set for each of the groups using the equation:

$$ES(G) = \bigcup_{Q \in G} ES(Q)$$

wherein ES(G) is an essential set of a group, G, and ES(Q) is an essential set of the query, Q;
modifying the initial ordering of the ordered subset of relevant expressions to give priority to those expressions in the essential sets;
selecting an expression from the ordered set of relevant expressions having a highest benefit value based on a feedback of the expression divided by the cost of executing the expression;
computing lower bounds and upper bounds on cardinalities for those expressions in the ordered set of relevant expressions where exact cardinalities have not yet been obtained;
using the lower bound to compute a low execution plan for the selected expression;
using the upper bound to compute a high execution plan for the selected expression;
computing a current execution plan for the selected expression;
determining that the low execution plan is equal to the high execution plan;
designating the current execution plan as a cardinality-optimal query execution plan where each expression in the plan has exact cardinalities; and
optimizing the query using the cardinal-optimal query execution plan.

* * * * *